United States Patent
Parmentier

(10) Patent No.: US 10,981,147 B2
(45) Date of Patent: *Apr. 20, 2021

(54) MULTI-CAPILLARY MONOLITH MADE FROM AMORPHOUS SILICA AND/OR ACTIVATED ALUMINA

(71) Applicant: Francois Parmentier, Saint Martin d'Heres (FR)

(72) Inventor: Francois Parmentier, Saint Martin d'Heres (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/986,756

(22) Filed: May 22, 2018

(65) Prior Publication Data

US 2018/0318794 A1  Nov. 8, 2018

Related U.S. Application Data

(63) Continuation of application No. 14/344,600, filed as application No. PCT/FR2012/000367 on Sep. 17, 2012, now abandoned.

(30) Foreign Application Priority Data

Sep. 15, 2011 (FR) ....................... 1102790

(51) Int. Cl.
*B01J 20/30* (2006.01)
*B01D 15/18* (2006.01)
(Continued)

(52) U.S. Cl.
CPC .......... *B01J 20/3078* (2013.01); *B01D 15/18* (2013.01); *B01D 15/1892* (2013.01);
(Continued)

(58) Field of Classification Search
CPC combination set(s) only.
See application file for complete search history.

(56) References Cited

U.S. PATENT DOCUMENTS 5,565,394 A   10/1996 Lachman et al.
7,638,182 B2 * 12/2009 D'urso .................. B82Y 20/00
                                                    428/188
(Continued)

FOREIGN PATENT DOCUMENTS

FR   2957276 A1   9/2011
WO   95/28279 A1  10/1995
WO   01/47634 A1   7/2001

OTHER PUBLICATIONS

Written Opinion received for PCT Patent Application No. PCT/FR2012/000367, dated Dec. 21, 2012, 10 pages of Original Document Only.

(Continued)

*Primary Examiner* — Ryan B Huang
(74) *Attorney, Agent, or Firm* — Womble Bond Dickinson (US) LLP

(57) ABSTRACT

The invention relates to a monolithic porous material based on amorphous silica or activated alumina or on one of their mixtures, the material comprising substantially rectilinear capillary ducts that lie parallel to one another, and being intended to be used as packing in a chromatography column, characterised in that:
the ducts have, relative to one another, a substantially uniform cross section;
the cross-section of each duct is uniform over its entire length;
the ducts pass right through the material;
the volume of micropores smaller than 0.3 nm is smaller than 50% of the total porous volume of the material.

4 Claims, 6 Drawing Sheets

(51) Int. Cl.
*B01J 20/08* (2006.01)
*B01J 20/12* (2006.01)
*B01J 20/18* (2006.01)
*B01J 20/28* (2006.01)
*B01J 20/283* (2006.01)
*B01J 20/284* (2006.01)
*B01D 53/04* (2006.01)
*G01N 30/60* (2006.01)
*G01N 30/52* (2006.01)

(52) U.S. Cl.
CPC .......... *B01D 53/0431* (2013.01); *B01J 20/08* (2013.01); *B01J 20/12* (2013.01); *B01J 20/18* (2013.01); *B01J 20/283* (2013.01); *B01J 20/284* (2013.01); *B01J 20/28004* (2013.01); *B01J 20/28045* (2013.01); *B01J 20/28069* (2013.01); *B01J 20/3057* (2013.01); *G01N 30/6043* (2013.01); *G01N 2030/528* (2013.01)

(56) References Cited

U.S. PATENT DOCUMENTS

2005/0023204 A1 2/2005 Nakanishi et al.
2006/0090649 A1 5/2006 Liu et al.
2009/0107330 A1* 4/2009 Gu ..................... B01D 53/228
                                                                    95/55

OTHER PUBLICATIONS

On et al. "Stability of mesoporous aluminosilicate MCM-41 under vapor treatment, acidic and basic conditions." Microporous and Mesoporous Materials, 1998, 22, 211-224.

Office Action received for EP Patent Application No. 12775729.2, dated May 6, 2015, 5 pages of Original Document Only.

International Search Report received for PCT Patent Application No. PCT/FR2012/000367, dated Dec. 21, 2012, 8 pages (3 pages of English Translation and 5 pages of Original Document).

International Preliminary Report on Patentability received for PCT Patent Application No. PCT/FR2012/000367, completed on Jan. 23, 2014, 16 pages (6 pages of English Translation and 10 pages of Original Document).

Ehrburger-Dolle et al., "Use of N2, Ar and CO2 adsorption for the determination of microporosity and surface fractal dimension of carbon blacks and silicas", Pure and Applied Chemistry, vol. 65, No. 10, 1993, pp. 2223-2230.

Babin et al., "MCM-41 silica monoliths with independent control of meso- and macroporosity." New J. Chem., 2007, 31, 1907-1917.

* cited by examiner

MULTI-CAPILLARY MONOLITH MADE FROM AMORPHOUS SILICA AND/OR ACTIVATED ALUMINA

FIELD OF THE INVENTION

The present invention concerns a monolithic porous material of amorphous silica or activated alumina, or one of their combinations, comprising substantially rectilinear capillary channels that are parallel to one another, passing through the material from end to end and intended in particular for use in chromatography.

BACKGROUND OF THE INVENTION

The close contact between two phases such as a gas and a liquid to promote their chemical or physical interaction is an important operation in chemical engineering.

To promote interface phenomena on the contact surface between these two phases, it is endeavoured to increase this contact surface as much as possible, and to increase the effects of mixing in the vicinity thereof.

For such purpose, beds of fine solid particles are frequently used through which a fluid passes and with which they interact.

These beds, called particle beds or packings, offer large exchange surfaces on account of the small size of their constituent particles, and on account of the large divided status of the fluid passing through them.

These phenomena promote the speedy accomplishing of material transfer processes, chemical reactions or any other diffusion-related phenomena.

Their applications particularly cover the fields of both analytical and preparative liquid and gas chromatography.

Chromatography is a particular technique, which has its own advantages and constraints and is thereby different from other related techniques, such as adsorption and heterogeneous catalysis, by applying solid packings and fluids.

In adsorption, it is sought to retain a compound of a fluid effluent on the surface of which it is adsorbed via an isotherm, or on which it reacts. It is sought to purify the fluid. Large specific surface areas are needed. High-capacity beds are necessary. The efficiency of the packing is not critical (number of theoretical plates) and the use of beds of granules with a diameter from 1 to 2 mm is preferred. Indeed the efficiency only has negligible influence on the dimensioning of the bed to the extent that it only acts on the stiffness of the percolation front which is good as soon as about 20 theoretical plates are attained. The adsorbent then needs to be regenerated by a combination of means, temperature, chemical reaction, which removes the adsorbed or combined impurities. The operation is therefore sequential but the cycle times are numbered in days or in weeks. The mass of the bed is dimensioned. The pressure drops are low.

In catalysis, it is sought to carry out a chemical reaction on the surface of the solid. It is desired that the reagents remain for an optimal time in contact with the solid. There again, this is a question of adsorption forces and chemical reactions. One is interested in the dwelling time criteria. Reasoning with a number of theoretical plates is inoperative. The regularity of the packing is one factor among others and is secondary before catalytic selectivity. It is not sought to separate the molecules. The pressure drops are low.

In chromatography, several components present in a fluid load sequentially admitted according to a short time interval counted in minutes are separated by propagating it from one entry point to an exit point of a solid column under the effect of an eluting fluid. The obtained separation may be achieved by a very wide variety of forces which start competing with the driving effect of the eluent, sharing, adsorption, steric interactions, ionic interactions, etc. . . . This method provides high resolving power, each component behaving differently. To enhance this resolving power, the column has to have a great number of theoretical plates, for example 1,000. This also means that the diffusion resistances should be minimized, and therefore that the diffusion distances should be short, and that the column has to be long. These combined factors have the result that chromatography is a technique which requires excellent regularity of the flow and therefore of the packing, and a small characteristic dimension of the latter, leading to pressure drops which rapidly become critical with particulate solids. These are the problems which have to be solved in chromatography.

On the other hand, preparative chromatography practically and simply feasible is one of the essential unsolved problems of chemical engineering.

In the prior art, for this purpose, devices with discontinuous columns of great diameter and so-called simulated mobile bed devices are essentially used. In this first case, the fine particle beds require working with high pressure drops making the device complex and costly. In the second case, a displacement of a solid packing is simulated by sequencing it in a train of individual fixed beds of small lengths, individual beds at the limits of which are moved the feeding point and the points for drawing off the products. These devices have moderate efficiency and are de facto essentially discontinuous in their management.

In the literature, packings for chromatography have been proposed, consisting of a large number of jointed capillary channels operating in parallel (Express gas chromatography on multicapillary columns and its potential, V. N Sidelnikov et al., Catalysis in Industry 2012, Vol. 2, N° 3, pp 206, 216). These different capillaries operate independently of each other since their walls are solid and non-porous. In particular, their diameters and their filling level by the stationary phase are always slightly different from each other. This operating independence causes a strong loss of efficiency because of the different rates of flow of the eluent fluid in capillaries of variable diameter. Because of this defect, these devices have not been developed significantly U.S. Pat. No. 5,332,480 of Datta and Beardsley describes an electrophoresis technique on individual annularly positioned and rotary capillaries. However this arrangement only has the purpose of easily cooling the capillaries which are positioned far from each other for allowing circulation of a coolant fluid at their periphery. The productivity of the apparatus is very low. Indeed, the capillaries have to be far away from each other in order to be cooled, are relatively only very few, and the fraction of the free section for the passing of the process fluid becomes very small. The capillaries do not include any stationary phase indispensable for obtaining chromatographic separation. Such a device cannot be used in chromatography. It will be further noted that the optimum diameter of the claimed capillaries is comprised between 100 and 250 micrometres and is not adapted for high productivity in the liquid phase chromatography for which a smaller diameter will be preferred. This point actually illustrates the fundamental structural difference between an electrophoresis method based on an applied external electric field for which the diameter of the capillary is not critical for the efficiency of the separation, and partition chromatography for which the efficiency closely depends on the diffusive distances between stationary and mobile phases. There is no obvious equivalence between both methods.

U.S. Pat. No. 4,657,742 to Beaver P. proposes an alternative to these particle packings comprising a tube packed with aligned fibres which may be porous and hollow. One disadvantage of this packing is that the eluting fluid flows both inside and outside the hollow fibres in the voids left between their stacking. Since the eluting fluid flows at two very different rates inside the hollow fibres and on periphery thereof in the interstices separating the fibres of circular section, there is resulting loss of efficacy. Another disadvantage of this device is that the walls of the hollow fibres must be sufficiently thick so that they can be handled and packed withstanding the mechanical stresses induced by the stacking thereof. This means that the diffusional balancing between adjacent fibres is slow, and the packing is little efficient. Another disadvantage of this device is that it is difficult to apply to bundles of fibres of large diameter since the chemical stability of the packing would be difficult to ensure.

U.S. Pat. No. 4,957,620 to Cussler E. describes the use of bundles of hollow polymer fibres for use as chromatographic column. The assembly suffers from the same disadvantages as above: the thickness of the wall of the fibres must be higher than that of the central channel in order to impart sufficient mechanical strength to these fibres allowing the handling and assembly thereof. As a result, transfers of material by diffusion between the material of the walls and eluting fluent are slow. The eluting fluid flows at two very different rates inside the hollow fibres and on the periphery thereof. Here again the stabilization of large diameter packing is difficult owing to the lack of strong bonds between adjacent fibbers.

U.S. Pat. No. 4,818,264 describes the use of bundles of capillary columns in glass or silica to perform multicapillary gas chromatography. This system has the serious drawback that the capillaries behave independently of each other. On this account, it is difficult to obtain identical behaviour of the different channels and careful, scrupulous attention must be given to the manufacture of channels that are all identical.

Patent application US 2005/0139536 to Belov Y. P. describes a chromatographic column whose channels are coated with different thicknesses of stationary phase so as to offset hydrodynamic inequalities between the different channels. This work exemplifies the difficulty in obtaining good performance levels with a multicapillary column formed of individualized channels which do not communicate by diffusion.

The publications by Nishihara H. «Ordered macroporous silica by ice templating», Chemistry of Materials, 28 Feb. 2005, pages 683-689 and Mukai S. R. «Formation of monolithic silica gel microhoneycomb (SMH's) using pseudo steady state growth of microstructural ice crystals »Chemical Communications, 4 Mar. 2004, pages 874-875 describe a potential pathway for forming multicapillary structures in silica. The documents refer to a method of manufacturing microstructures of ordered porous silica, of honeycomb shape and 3.6 to 40 pm in diameter. The method comprises causing directional growth of ice crystals in low-cohesion silica gels and evaporating a solvent by freeze-drying.

However, the described method only functions with silica gels having low cohesion i.e. with low silica concentration. The structures obtained are therefore very lightweight, namely having a density of the order of 0.12 g/cm$^3$ according to the authors of these publications. The relative volume of the capillaries is high. As such, they will not perform well in liquid chromatography for which a dense packing is sought having strong retention capacity. In addition, packing that is so lightweight is mechanically fragile.

Additionally, examination of all the photographs in the two articles shows that the diameters of the channels differ by a factor of about 10, and that these channel diameters fluctuate to a large extent and are irregular over their length. These channels have most variable environment and morphology, their cross-section possibly being square, pentagonal, hexagonal, etc. These irregularities mean that such packing is inefficient for high performance analytical chromatography for which perfect homogeneity of the packing is required.

Finally, the packings described in these articles are obtained over a restricted range of diameters, from 3.6 to 42 μm. Yet, the range extending below 2 μm is of particular interest for application in high pressure liquid chromatography (HPLC), and the range extending above 50 μm is of particular interest for application to gas chromatography.

U.S. Pat. No. 6,210,570 to Holloway R. describes monolithic packing in porous silica for chromatography. Said packing is formed of more or less spherical pores forming tortuous passages through the packing. These passages are tortuous and a fluid passing them encounters numerous obstacles, the pores and the solid being randomly distributed in space within the packing. This forms a major difference with a flow through an empty capillary tube in which the fluid does not encounter any microscopic obstacle over an optimal rectilinear pathway. They display a lower pressure drop than a particle packing but higher than that of a capillary having the same separation efficacy for a given analysis, and have intermediate separation impedance between the two. They have the advantage of allowing a macroscopically uniform flow of the eluting fluid through the packing on account of their monolithic structure, unlike the case with the stack of capillary tubes described in patent U.S. Pat. No. 4,657,742.

The following publications: N, Ishizuka, Designing monolithic double pore silica for high speed liquid chromatography, Journal of Chromatography A, 797 (1998), 133-137, K Nakanishi, Phase separation in silica sol-gel system containing polyacrylic acid, Journal of non crystalline Solids 139 (1992, 1-13 and 14-24, K. Nakanishi, Phase separation in Gelling Silica-Organic Polymer Solution: Systems Containing Poly(sodium styrenesulphonate), J. Am. Ceram. Soc. 74 (10) 2518-2530-30 (1991) deal with the same subject matter as the Holloway patent. The aim is to obtain a monolithic packing in silica comprising two families of pores, one of interconnected macropores in which a liquid is able to flow relatively freely and the other a family of mesopores or micropores creating a specific surface area and hence activity for the exchange of material.

Patent PCT WO01/47637 of Faber et al. describes a y (gamma) alumina and zeolite monolith intended for catalysis. Application to chromatography is not mentioned. The method for manufacturing this monolith comprises sintering at 850° C. where boehmite becomes gamma alumina, thereby losing its chromatographic properties. Further this monolith has a channel diameter of more than 1 mm.

US patent application 2006/0090649 of Wei Liu presents a ceramic monolith intended for applications as a mineral membrane and not in chromatography. The only known means for preparing these monoliths in the state of the art involves high temperature sintering which makes the material lose its chromatographic properties. The claimed diameter for the channels is greater than 0.5 mm.

Patent PCT WO 95/28279 of Purushottam et al. presents a monolith for which the base material is active coal (carbon activated honeycomb, in the title). Indeed it is clearly mentioned on page 17 line 11 and 12 that the structure consists of a carbon continuum or backbone. A third-party mineral solid body may be added into the carbon, but the latter has a too small volume or is of a shape such that it does not form a monolith or the base of the latter. The described method does not give the possibility of obtaining a monolith (literally «a single stone») based on an aluminosilicate. In particular, this is not a sol gel method. French patent No. 2 957 276 does not mention the proportion of micropores with a diameter of less than 0.3 nm present in the packing. Now these pores decrease the capacity of the packing for a chromatographic application. They cause a highly significant decrease in the diffusion flow between the adjacent channels, thereby being detrimental to the efficiency of a chromatographic column using them. This patent does not mention combinations of alumina and silica.

U.S. Pat. No. 5,234,594 presents a filter consisting of contiguous rectilinear channels in a glass matrix. However this matrix is not porous. This is solid glass. According to the present invention, the material separating the channels has to be pores so that the behavioral differences between the adjacent channels are balanced by diffusion and more chromatographic efficiency is obtained. This porous nature of the wall of the channels unambiguously emerges from the drawings 1 and 2 and from the wording of claim 1.

U.S. Pat. No. No. 5,864,743 of Tuchinsky et al. describes a method for making multi-capillary packings in alumina characterised in that a powdery alumina layer immersed in a binder around an element formed by powdery carbon immersed in another binder is assembled, in that such elements are joined in a bundle, in that they are extruded once or twice, in that the binders are removed, in that the carbon is burnt and in that high temperature sintering of the thereby shaped alumina is caused. In order that this be practically possible, sintering should be carried out at a temperature not very far from the material's melting point or of the order of the latter, i.e. 2,050° C. for alumina, or of the order of its boiling point, 3,000° C. for alumina. This means in practice that the obtained alumina will have undergone deep dehydration and an allotropic transformation after having been subject to the temperature required for sintering, and it will be alpha alumina with low specific surface area, and not activated alumina with a high specific surface area, the only interesting one for uses in adsorption or for chromatography. The porosity, the specific surface area and the porous volume will have been extensively decreased regardless of the sintering temperature. Such packings are only of marginal interest for chemical engineering. On the other hand, the extrusion steps are extremely detrimental to the quality and regularity of the final product. The peripheral fibres of the extruded bundle will be subject to stresses, shearings and deformations extremely different from those located in its centre, and their morphology will be thereby affected. This will be all the more critical since the binders will have non-Newtonian behaviour. Finally the actual sintering is a highly penalizing operation dimensionally, particularly for parts of large dimensions. During sintering, significant shrinkages and changes in dimensions occur, which are difficult to control, which are the major causes of irregularities and defects in the final packing.

However, the large majority of separations are still conducted on particle beds, which are easier to manufacture.

There is therefore a need for a product having advantages in terms of reliability and ease of manufacture of particle packing, allowing the uniform microscopic and macroscopic flow of eluting fluid in the bed, whilst maintaining the advantages of capillary columns.

BRIEF DESCRIPTION OF THE INVENTION

For this purpose, the invention proposes a monolithic porous material based on amorphous silica or activated alumina, or one of their combinations, comprising substantially rectilinear capillary channels parallel to one another, characterised in that:
  the channels have a substantially uniform cross-section in relation to one another,
  the cross-section of each channel is regular over the entire length thereof,
  the channels pass through the material from end to end,
  the volume of the micropores of less than 0.3 nm is less than 50% of the total porous volume of the material.

By combination is meant any formulation mainly containing silica and alumina in a combined form or in the form of mixtures, or simultaneously in a combined form and in the form of mixtures.

The invention also covers any packing comprising in its structure or immersed in the latter, a portion fitting this definition.

Advantageously for this monolithic porous material, the combination of silica and alumina is an aluminosilicate.

Advantageously for this monolithic porous material, this aluminosilicate is a clay.

Advantageously, the total and cumulative length according to which the channels extend along a preferential direction of flow of a fluid is greater than or equal to 10 mm.

By total and cumulative length, is meant the total length covered with the channels in the direction of the eluent stream.

Advantageously, the length of the channels is equal to or greater than 10 mm, preferably greater than 20 mm and further preferably greater than 50 mm.

By «based on» is meant that the continuous and rigid structure of the monolith is essentially formed of amorphous silica or activated alumina, or of aluminosilicate, optionally surface-modified.

By «substantially uniform cross-section» is meant herein that the diameters of the different channels are close to each other i.e. in particular that the mean diameter of one channel does not on average differ by more than 30% from the average of the diameters of the channels.

The standard deviation of the diameter of the channels is less than 30% of the mean of the latter, preferably less than 5% of the mean of the latter.

By «regular cross-section» is meant that the channels respectively have a substantially constant cross-section over their entire length, i.e. the diameter of a channel does not vary by a factor of more than 2 between the narrowest regions and the widest regions.

The material advantageously has a density of more than 0.12 kg/litre.

In particularly advantageous manner, the material has a relative volume of the capillary channels that is less than 90%.

The thickness of the wall between two adjacent channels, in its narrowest part, is advantageously less than one half of their diameter.

Advantageously, the material includes channels with a diameter of less than 2 mm, and more preferentially less than 0.25 mm, preferably less than 0.1 mm.

According to one embodiment of the invention, the capillary channels have a diameter of between 0.1 and 1.5 micrometres.

According to another embodiment of the invention, the capillary channels have a characteristic diameter or cross dimension of more than 50 μm.

The material is advantageously formed of amorphous silica, which may or may not be silane-modified on the surface, or of activated χ or η alumina which may or may not be surface modified.

The material advantageously consists of γ, κ or θ alumina which may or may not be surface-modified.

According to an embodiment of the invention, this material contains or supports a third party solid body.

In particular, this third party solid body may be a zeolite.

The monolithic material advantageously has an elongate shape characterised by a length (i.e. the length of the capillary channels) greater than its dimension in a direction perpendicular to the channels.

A further subject of the invention is a chromatographic column whose packing comprises at least one monolithic porous material such as described above.

Advantageously, the monolith is sufficiently long so that a single monolith is sufficient for application in chromatography.

Optionally, several monoliths can be stacked.

A further subject of the invention is an axial, continuous annular chromatographic instrument in which the packing comprises at least one monolithic porous material such as described above.

A further subject of the invention is a radial, continuous annular chromatographic instrument in which the packing comprises at least one monolithic porous material such as described above.

The invention also concerns a process for manufacturing a monolithic porous mineral material comprising substantially rectilinear capillary channels parallel to one another, characterised in that it comprises the steps of:
  providing a bundle of so-called precursor fibres of the channels whose diameter is equal to the diameter of the capillary channels,
  forming a matrix around the fibres,
  eliminating the fibres so as to form said capillary channels in said matrix.

Advantageously, the matrix consists of porous amorphous silica, of activated alumina or of porous aluminosilicate.

According to an embodiment of the invention, removal of the fibres is achieved through lumens or interstices left free between the juxtaposed fibres of the bundle.

According to a preferential embodiment of this method, the formation of a mineral solid porous matrix around the fibres is ensured by a sol gel method.

Advantageously, the porous mineral solid consists of amorphous silica or activated alumina or of one of their combinations like an aluminosilicate.

Advantageously, the porous mineral solid consists of zirconium oxide or titanium oxide.

Optionally, the precursor fibres of the channels comprise an ablative layer of coating material which is eliminated at a first treatment step for fibre removal.

Advantageously, the porous mineral solid is reinforced by depositing silica at the surface of the particles making it up before drying.

According to one particular embodiment of the invention, the precursor fibres of the channels optionally comprising their coating of ablative material are coated with a spacer before forming the bundle so as to ensure a minimum thickness of monolith between two adjacent channels.

According to one embodiment of this method, the fibres are formed of a hydrolysable polymer, the fibres are assembled in a bundle, the bundle is immersed in a silica gel precursor solution, this solution being caused to gel around the fibres, and the fibres are removed by hydrolysis to soluble species of low molecular weight.

By «silica gel precursor solution» is meant a liquid whose composition is such that as it develops under the conditions of the manufacturing process, it leads to a silica gel.

According to another embodiment of this method, the channel precursor fibres are of wire fibre with low melting point coated with a spacer, assembled into a bundle, the bundle is immersed in a silica gel or activated alumina precursor solution, this solution being caused to gel around the fibres and the fibres are eliminated by melting and draining the molten liquid outside the material.

If the material is amorphous silica, this amorphous silica can be reinforced by depositing silica on the surface of its constituent particles before it is dried.

According to one embodiment of this process, the porous matrix of amorphous silica has a high proportion of macropores allowing the circulation of a fluid within the monolith. Advantageously this proportion is greater than 40%.

Alternatively, the invention proposes a process for fabricating a monolithic porous material of amorphous silica comprising substantially rectilinear capillary channels that are parallel to one another, comprising the steps of:
  forming channels in at least one sheet of a silicone elastomer,
  stacking or rolling this or these sheets so as to form conduits which will form capillary channels,
  pyrolysis and oxidation of the silicone to amorphous silica.

Advantageously, according to this latter method, the silicone is loaded into a third-party solid body before its pyrolysis.

Alternatively, the invention proposes a method for manufacturing a monolithic porous material based on amorphous silica, activated alumina or on one of their combinations, characterised in that it comprises the steps of:
  providing a bundle of so-called precursor fibres of the channels, the diameter of which is equal to that of the capillary channels,
  forming a crosslinked silicone matrix including a load of porous amorphous silica, activated alumina or of one of their combinations around fibres,
  removing the fibres so as to form, in said matrix, said capillary channels,
  pyrolysing the silicone so as to leave an amorphous silica residue binding the particles of the load.

BRIEF DESCRIPTION OF THE DRAWINGS

Other characteristics and advantages of the invention will become apparent from the following detailed description with reference to the appended drawings in which.

DETAILED DESCRIPTION OF THE INVENTION

Figure 1:
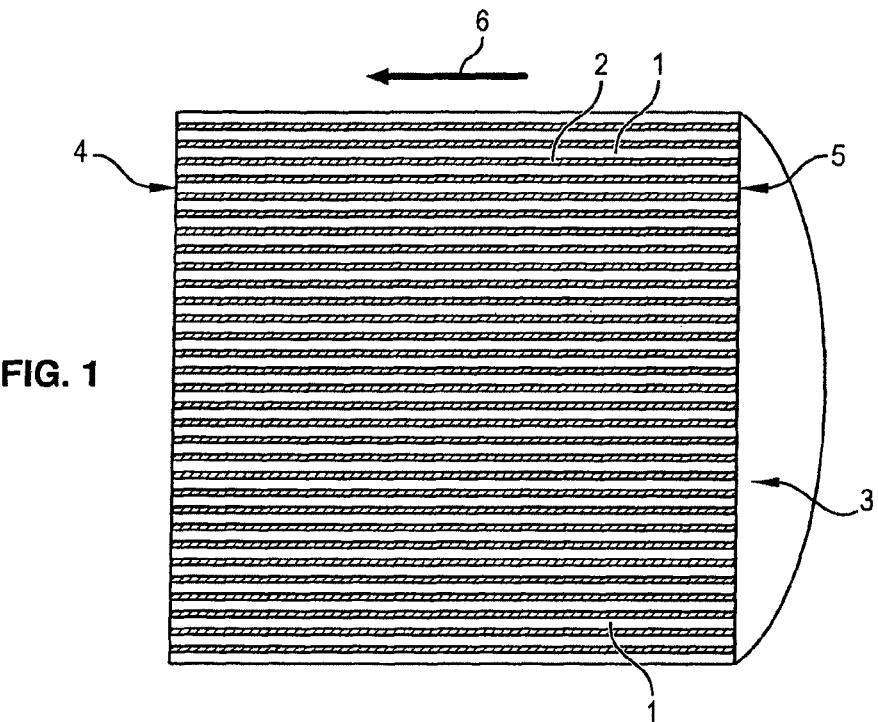
FIG. 1 is a cross-sectional view of a cylindrical multicapillary packing for chromatography according to the invention, following a direction perpendicular to its major axis.

The invention allows a structure to be obtained that is capable of competing with particle packings, in the diversity of applications thereof and in particular in chromatography.

The monolithic material is a solid (amorphous silica, activated alumina or one of their combinations) that is essentially porous and comprising a multiplicity of rectilinear, contiguous channels that are parallel to one another, which are channels of capillary dimensions i.e. a diameter not exceeding a few millimetres) and which impose a preferable direction for the fluid in the bed. The porous mass offers a large exchange surface between the fluid and the solid, which may be an adsorbent or the medium of a stationary phase.

The porous mass may itself be the support of another active or useful material with regard to the final use.

Chromatography is a particular molecular separation method characterised in that it carries out a separation of a chemical mixture of substances under the contradictory action
- of dynamically carrying away these species with a stream of an eluting phase,
- of retaining the species with a stationary phase.

Preferably this method is continued until complete elution of the species separated out of the stationary phase.

It will be understood that for a chromatographic application, the porous solid forming the packing will be a material which may be used for chromatographic separation, like a porous silica from a precursor solution of a silica gel (i.e. a silica gel), and amorphous silica from the pyrolysis of a silicone or of any silicon-based material which may be used for a chromatographic application. This in particular excludes from the field of the invention, materials such as deactivated alpha type alumina like the one from a sintering operation of an extruded honeycomb and extensively dehydroxylated surface silica such as the one stemming from a high temperature treatment like silica glass.

Advantageously, silicas for which the surface includes between 2 and 8 hydroxyl groups per square nanometre will be selected. This characteristic is measured before an optional surface treatment like silanisation. This may correspond in particular to a heat treatment at a temperature below 700° C. On this matter, for example, consult the textbook «Chromatographies en phases liquide et supercritique» (Liquid and supercritical phase chromatographies) R. Rosset, M. Caude, A Jardy, Editions Masson, 1991, pp 224-226.

Among the aluminas which may be used in chromatography, so-called activated aluminas of the x or $T_1$ form will preferably be selected.

It will be understood on the other hand that devices according to the invention may be obtained by attaching and depositing on a porous monolith consisting of any material, an active layer of porous silica, of activated alumina, or of one of their combinations intended to promote chromatographic separation. This deposition may be accomplished in a liquid phase by soaking in an active material suspension, in a gas phase by chemical vapour deposition for example. It will be also possible to transform a base material of a monolith into a porous material which may be used for chromatographic separation according to the invention.

The porous nature of the solid allows exchange of material by diffusion between the adjacent channels, therefore allowing concentration gradients to be reduced between neighbouring capillary channels and a reduction in their irregularities.

These irregularities are due to small differences in terms of topology and diameter between the different channels.

The monolithic structure of the packing obtained also allows the ensured transiting of the entirety of the fluid through the core of the channels without any other possible pathway, and the ensured mechanical cohesion of the packing.

A monolith can be defined as follows: a structure having a multiplicity of channels of capillary dimensions operating in parallel crossing through a mechanically cohesive mass of porous material from end to end.

The monolith may be of any suitable length for the process to be carried out, between a few millimetres and several metres.

The monolith may have a cross-section that is suitable for the process to be carried out, between a few square micrometres and several square metres.

The monolith will preferably have high porosity towards molecules commonly encountered in industrial practice. Its microporosity may be variable depending on the needs. In order not to lose any porous volume with regard to a practical application, the proportion of its micropores with a diameter of less than 0.3 nm will preferably be less than 50% of the porous volume of the monolith, a porous volume measured by excluding the volume of the channels. Still more preferentially, it will be less than 20% of this volume, and even more preferentially less than 10% of this volume.

Today there exist two main techniques for obtaining mineral monoliths: extrusion and coating of metal honeycomb walls. These techniques do not give the possibility of producing very fine channels, truly capillaries, and with a diameter of less than one or a few millimetres at a low cost.

Advantageously according to the invention, the diameter of the rectilinear channels or conduits will be less than 2 mm, preferably less than 0.25 mm and still more preferentially less than 50 micrometres.

Two main mineral oxides are known for achieving chromatographic separations: amorphous silica and activated alumina. The first is a silicon oxide, and the second is an aluminium oxide. These two oxides have numerous points in common, in particular:
- they can be obtained in the form of solids with high specific surface area, several hundred $m^2$ per gram;
- they can be shaped using the sol-gel route;

they have a very active surface for the adsorption of organic molecules, making them selective for a chromatographic separation process.

The packing materials of the invention are therefore preferably composed of amorphous silica or activated alumina.

It will be noted that it is possible to obtain gels consisting of the reaction mixtures of silica and alumina like aluminosilicates. In particular peptisation of clays like kaolinite and their coagulation in the presence of salts in solution allows access to methods entering the scope of the invention, like consisting of a combination of silica and alumina. Generally, the use of gels allows lowering of the temperatures applied in methods for stabilisation and hydroxylation of the mineral and retention of the porous structure of the gel and of its allotropic variety.

According to the invention, the cross-sections of these channels are regular and uniform i.e. the channels respectively have a substantially constant cross-section over their entire length and diameters of close size.

By regular or substantially constant cross-section is particularly meant a diameter which does not vary by a factor of more than 2 between the narrowest regions and the widest regions of one same channel.

By diameters of close size is particularly meant that the mean diameter of a channel does not on average differ by more than 30% from the average of the diameters of the channels.

In other words, and if it is assumed that the diameters of the channels are distributed according to a reduced centred normal law, the standard deviation must preferably not exceed 30% of the average of the diameters of the conduits. Preferably, this standard deviation does not exceed 5% and further preferably 0.5% of the average of the diameters of the conduits.

Preferably the channels have a constant and uniform arrangement and shape.

According to one preferred embodiment of the capillary channels, the channels preferably have a substantially circular cross-section.

However, the channels may assume different geometric shapes, in accordance with the method of manufacture of the fibres used for fabrication thereof. These geometric shapes may be a circle, a square, a polygon with substantially equal sides. The diameter of the channel in this case is the diameter of the circle inscribed within this geometric shape.

According to one preferred embodiment of the invention, the multicapillary packing contains a high proportion of solid.

A high volume proportion of a solid with a high specific surface area increases packing capacity and requires a smaller volume of bed. In particular, this proportion is such that its density is greater than 0.12 kg/litre and is preferably greater than 0.15 kg/litre.

In even further relevant manner, these packing materials are defined by the proportion of volume occupied by the capillary channels in the monolith. In this text, this ratio will be called the «relative volume of the capillaries».

Preferably the relative volume of the capillaries is less than 90%, more preferably less than 80% for analytical applications. For preparative chromatography applications, the relative volume of the capillaries may be much lower, preferably but not limited thereto less than 40%, more preferably less than 20%, so as to increase the packing capacity to a maximum.

Preferably, the wall separating the adjacent parallel channels at its narrowest point has a thickness less than one half of their diameter or of their characteristic transverse dimension.

It will be noted that thin walls promote smooth operation of a sol gel method. Indeed the stresses developed in the material during its drying are all the weaker since its thickness is reduced.

Preferably, the walls separating the channels are regular in dimension and in arrangement.

Preferably, for absorption processes, the gel forming the monolith comprises a high volume of mesopores of diameter 4 nm to 25 nm, so as to create a specific surface accessible by diffusion.

The porous volume measured, excluding the volume of the channels, may for example be between 0.3 and 3 cm$^3$/g for silica and between 0.2 and 0.5 cm$^3$/g for alumina.

For silica, if bimodal gels are used such as those described in the Holloway patent and in the publication by N, Ishizuka, the porous volume may be notably higher when including the macropores.

In the case of silica, the porous volume measured by excluding the volume of the conduits will therefore be greater than 0.3 cm$^3$/g.

Preferably, for absorption processes the gel forming the monolith has a high specific surface area, of between 90 m$^2$/g and 600 m$^2$/g for example, for silica and alumina.

Preferably, for implementation of the invention, the monolith has a high number of channels, for example more than five, preferably more than fifty, further preferably more than five hundred.

It is noted that the pressure drop in a multicapillary packing is of one or two orders of magnitude smaller than in a bed of particles of same characteristic dimension. This results from expression of the laws of Darcy and Poiseuille.

Therefore, the separation impedance of a multicapillary packing in chromatographic separation may be increased by one or two orders of magnitude compared with a particle packing.

The multicapillary packing comprises a large number of capillaries of equal length and mean radius R. It is considered that the diameter statistically follows a normal law with a standard deviation or sigma $\sigma_R$. It can be calculated that for this multicapillary packing the maximum number of theoretical plates of chromatographic separation which can be obtained is written as:

$$N_{R,max} = R^2/(9 \cdot \sigma 6_R^2)$$

For example, if the relative standard deviation is 1%, the maximum number of plates of the separation will be $1.1 \cdot 10^5$. If this diameter has a relative standard deviation of 1%, 1,100 plates are already available which is sufficient for numerous chromatographic separations.

The relative standard deviation is the ratio of the standard deviation over the average of the distribution.

The results can in fact be improved if the channels are not perfectly individualized but are closely stacked or close to each other with sufficiently thin walls separating them such that the transfer of material takes place between each channel and its closest neighbours.

This can be achieved by fabricating the multicapillary packing in a partly or fully porous mass allowing each channel to equilibrate with its neighbours via diffusion. The resulting effect, whose calculation depends on the spatial arrangement of the capillaries, will be an attenuation or damping of the difference in behaviour of the individual channels, owing to transfers of diffusive material from one channel to another.

The observed resulting effect is an increase in efficacy, the random variations in the diameters of the channels being averaged out by the diffusion process.

According to another advantage of the invention, the porous mass is the medium of a stationary phase for chromatography or itself forms the stationary phase through its high specific surface area.

According to another advantage of the invention, the much smaller pressure drop through a multicapillary packing of equal characteristic dimension allows a strong increase in separating power.

The pressure drop of a particle bed follows Darcy's law. The pressure drop of a multicapillary packing follows Poiseuille's law.

The pressure drop of a liquid phase (water at ambient temperature) for a bed of particles of diameter 5 μm is 250 bar/m, and for capillaries of diameter 5 μm it is 18 bar/m at an eluting rate of 1 mm/s relative to the total cross-section of the column. The void fraction of the multicapillary packing is assumed to be 0.7.

The pressure drop of a multicapillary packing of length 100 mm in this case is only 1.8 bar.

This in fact means that much narrower capillaries can be used and that the speed of analysis and efficacy can simultaneously be considerably increased in existing analytical chromatic equipment.

These different packing materials show linear dependence of pressure drop on eluent velocity and length.

The separation impedance E is given by the formula:

$$E = t_0 \Delta P / (N^2 . \eta)$$

For a particle packing, it is 2350.
For a multicapillary packing, it is 115.

A multicapillary packing is higher by two orders of magnitude in terms of impedance and separation. As mentioned previously, this means that very small capillaries can be used with high pressure pumps and their peripherals and analysis speeds and efficacies can be increased by one order of magnitude.

For example, a multicapillary packing for HPLC can be proposed as follows: in liquid phase for a given pressure drop, for a given number of required theoretical plates, the diameter $d_c$ at optimal efficacy will be written as follows for a single capillary:

$$d_c = (128.\eta.N.D/\Delta P)^{1/2}$$

For a pressure drop of between 80 and 180 bars, and high efficacy of 100 000 plates, the following equation can be drawn:

$$d_c = 0.84 - 1.46 \ \mu m$$

From a practical viewpoint, a packing for liquid phase analytical chromatography may comprise a bundle of thousands of capillaries of diameter from 0.1 a 5 μm, and preferably a diameter of 0.1 to 1.5 μm separated by walls having a thickness of 0.05 to 1.0 μm thickness in porous silica or alumina of high specific surface area.

Also, for gas chromatography, the channels are preferably given a diameter of more than 50 μm so as to maintain an acceptable pressure drop.

The invention preferably concerns a packing for which the porous mass has a surface area of more than 20 m² per gram.

The diameters of the capillaries are preferably distributed following a normal law having a mean standard deviation of less than 0.5% of the average.

The minimum elution time at optimal efficacy is 10 to 30 seconds for a column of length 100 mm, allowing very rapid and very efficient analyses compatible with the response times of existing detectors.

The packing allows a specific analysis speed of 3300 to 10000 plates per second.

So that the feed rate is from 0.8 to 2.6 pl/mn, compatible with the pumping system developed for packed microcolumns, 3000 to 10000 capillaries must be arranged in parallel. Higher feed rates can be ensured by simply increasing the number of capillaries in parallel and the cross-section of the packing.

For good efficacy of these structures, the homogeneity and regularity of the final packing must be as good as possible. The porosity of the walls of the channels must be high, the void fraction best being 30 or 40% or even higher. The thickness of the walls of the channels must be as narrow as mechanically possible to increase the speeds of diffusion phenomena.

Also, the very low pressure drop of a multicapillary packing allows the practical obtaining of devices which up until now have remained without any notable use.

A multicapillary packing can be seen as the assembly of a large number of adjacent chromatographic columns.

The chromatographic packing allows the obtaining of a tool that is both flexible and easy to use for performing preparative chromatography, continuous annular chromatography, in addition to conventional techniques of simulated mobile bed type.

A standard apparatus for continuous annular chromatography comprises:

- an annular cylinder of multicapillary packing whose channels lie parallel to its major axis. The two ends of this packing are planar and perpendicular to its axis and act as support for the fluid inlet and outlet assemblies.
- Fluid inlet and outlet assemblies comprise separated angular sectors which are fed with mixture to be separated or with eluting solvent on the inlet side, and collect the different eluted fractions on their outlet side. The walls delimiting the feed and collecting sections are either in contact with the packing via a seal sliding on the surface thereof, or they are positioned very close to the cylindrical packing (within a few micrometres for example) but not in contact therewith.

The inlet and outlet assemblies are fixed relative to one another for a given separation at a given time.

The packing cylinder and the group formed by the inlet and outlet assemblies move relative to one another in a movement of revolution about the axis of the packing cylinder.

This movement may be imposed upon the packing by a shaft to which it is attached. In this case the packing rotates in an outer ferrule machined so as to leave slight play between the packing, or a protection containing the same, and the ferrule under consideration.

Alternatively, it is the packing which is immobile and the inlet and outlet assemblies are set in rotation.

The charging of the mixture to be separated and of the eluting fluid is made through the different inlet sectors on the upstream side of the packing.

The collection of the separated fractions is similarly performed on sectors of the downstream surface of the packing.

The constancy of residence time of each component in the packing allows the collection thereof at defined, constant, angular distances of the inlet sector.

The continuous feeding of the inlet sector, under these conditions, produces continuous collection of the separated components in the outlet sectors.

The use of multicapillary packing materials in continuous annular chromatographs allows the lateral diffusion of the elution bands to be minimized to its pure diffusive component.

This is an important difference with devices formed of particle packing materials.

This leads to an increase in separating power measured in NUT or NETP compared with particle packing materials of the prior art.

Without departing from the scope of the invention, the capillary channels may be in the form of slits or bands.

In very similar fashion, it is possible to use the packaging materials of the invention in continuous radial chromatography.

In this case, the multicapillary packing is conformed as a cylinder in which the capillary channels extend radially and not axially. Their operating principle is very close to that just described (see also FIGS. 4, 5 and 6), the eluting fluid and the compounds to be separated in this case flowing inside the cylinder towards the outside of the cylinder, or vice versa. The feed and collecting sectors, in this case, are axial bands moving continuously relative to the annular cylindrical packing.

Continuous annular chromatography particularly allows the separation of a large number of components having very close retention times, such as isomers, optical isomers, position isomers, etc. . . . in a single pass in a single instrument, or in several passes in instruments placed in cascade with or without intermediate re-concentration of the eluates.

The multicapillary packing materials of the invention can be manufactured using any method known in the prior art and using the novel processes described below. The following processes are particularly well adapted.

One first process consists of covering and coating a bundle of fibres with a solid matrix material and of destroying or removing the material of the fibres so as only to leave the coating matrix subsisting through which the capillary channels pass.

The fibres are therefore the precursors of the capillary channels.

The fibres can be removed by mechanical action, by fusion, vaporisation, dissolution, chemical attack, etc. . . .

Since the fibre acts as mould for the final capillary, very tight manufacturing tolerances thereof allow very regular capillaries to be obtained down to micron sizes using well known monofilament production techniques, and therefore excellent performance levels of separation can be reached. Submicron fibres exist. Nanometric fibres are in the course of being developed. Schematically the aim is to prepare a composite material of which only the matrix is left to subsist.

A process according to the invention therefore comprises the steps of joining the precursor fibres of the capillary channels with a binder, thereby creating a matrix around the precursors, and removing the core of the precursor fibres supporting the matrix by any means, dissolution, oxidation, chemical attack, fusion and draining of the liquid, gasification so as to leave the matrix which can be used as base for chromatographic packing.

One simple solution consists of assembling a bundle of hydrophilic fibres of the required diameter, immersing same in an aqueous solution or suspension of a silica gel or alumina precursor solution or of one of their combinations whose polymerization and/or the gel are ensured in situ.

In the present text, by «silica gel precursor solution» is meant a liquid of composition such that its development under the conditions of the manufacturing process leads to a silica gel. In particular, it may be:
an acidified aqueous solution of an alkaline silicate,
an aqueous solution of an alkaline silicate whose metallic ions have been absorbed and exchanged with H+ ions by an ion exchange resin in its acid form, a silica sol prepared by precipitation-growth of monomer or weakly polymerized silica in a slightly basic aqueous phase on nuclei to form spherical nanoparticles,
an aqueous solution at determined pH of an organometallic molecule derived from silicon such as an alkoxysilane e.g. tetraethoxysilane, or tetramethoxysilane.

Similarly, by «alumina gel precursor solution» is meant a liquid of composition such that its development under the conditions of the manufacturing process leads to an alumina gel.

Examples of all such solutions and of such methods will be found in the following publications: «Silica-based packing materials for PREP HPLC, SFC and SMB», D. Sanchez, Analysis magazine, 1998, 26, No. 7; «Alumina gels that form porous transparent $Al_2O_3$», B. E. Yoldas, Journal of Materials Science, 10, (1975), pp 1856-1860.

The small contact angle between the material of the fibre and the solution promotes the creation of a film of homogeneous solution between the fibres.

To form the capillary channels, the fibres are hydrolyzed in an acid medium for example or carbonized and burnt.

Packing materials of porous silica and grafted porous silica can be obtained in this manner.

Packing materials of activated alumina can be obtained following the same scheme.

For improved quality and homogeneity of the packing obtained, it may be useful to start by coating the fibres with a jacket layer of a coating material called spacer material before assembling into a bundle.

It is possible that bare fibres may touch one another at contact points or lines and this will generate points of weakness and non-homogeneity in the packing.

In this case the process comprises coating a metal or non-metal fibre with a thickness of adequate coating material called a spacer, then joining these fibres into bundle optionally with a binder, and selectively eliminating the material of the fibres by fusion, dissolution, vaporisation, chemical attack, etc.

In particular, the spacer may be porous and is partly or fully integrated in the final monolith.

The jacket or layer of spacer coating material can be deposited by co-extrusion of a core fibre with a polymer or a gel.

It can be deposited by immersing in a solution of a polymer, or oligomers subsequently treated by thermal polymerization or UV and cross-linking.

The jacket may be formed of a chemical deposit (metal, oxide), deposited by vapour phase, plasma spraying, vacuum evaporation, liquid phase deposit. It can be deposited or sprayed using electric or electrostatic fields for non-conductive materials, the fibre being electrified to a certain potential, and a spacer powder being electrified to a potential of opposite sign and placed close to the fibre so that it can be deposited thereupon. It can be deposited by a printing technique of inkjet type. It may be formed of an agglomerated powder or gel deposited by passing through a bath or liquid suspension.

The spacer may be formed of a powder deposited in a thin film from a suspension, or of any material able to be deposited in a film.

In particular, it may be made by immersing the fibre in a suspension containing at least two constituents, first a powder mesoporous or microporous solid mineral, silica gel, activated alumina, zeolite, or any other material and second a mineral binder, silica or alumina sol, or peptised clay notably.

The first constituent carries the chromatographic separating function or for another purpose and can be obtained by any known method, the function of the second constituent being to bind the solid particles mechanically together allowing handling of the coated film and its assembly into a bundle.

The binding action can be ensured by the sol gel, by drying, or by its gelling followed by drying thereof.

Preferably, and so as not to clog the possible mesopores and micropores of the powder mineral solid, as mineral binder a sol is used whose elementary particle size is greater than that of the mesopores, or micropores.

It is possible in particular to ripen the sol under conditions causing its partial aggregation before mixing it with the mesoporous or microporous mineral solid.

For silica, this ripening can be conducted in a manner well known in the state of the art by combining pH, temperature and ionic strength of the sol medium.

Finally, it is possible to use relatively dilute binder sols.

One or more organic texturing additives, or binders can be added to the immersion suspension so as to impart sufficient mechanical strength to the fibre for handling and shaping thereof.

These additives may form part of the final monolith or they may be removed at a subsequent phase of the process.

It will be noted that in the foregoing, the binding action is understood as having to bind the spacer layer to the fibre in a first phase.

The mechanical strength of the spacer can be ensured by sintering if the fibre withstands high temperatures (as is the case for iron or steel fibre for example) and preferably when the spacer does not consist of amorphous silica with high specific surface area or of activated aluminas, both of these substances losing their specific surface areas and their activity at the high temperatures required by sintering. This operating procedure may for example be applied to a spacer consisting of glass beads.

The mechanical strength of the spacer may be ensured by baking allowing establishment of hydrogen bond type forces between the solid particles.

The silica is used in its amorphous state.

For alumina, which exists in numerous crystallographic forms that are more or less active and more or less crystallized, preferably alumina gels are used prepared from trihydrates (hydrargilite ou bayerite) or monohydrates (boemite) activated by controlled calcining to a transition alumina, in particular the aluminas $\chi$ or $\eta$ useful in chromatography. $\kappa$ and $\theta$ aluminas may be obtained by a heat treatment at a higher temperature while losing their activity.

Alternatively, the alumina gel will be prepared starting with monohydrate (boehmite) activated by calcination into a y alumina useful for its catalytic support activity.

Preferably, in this case, the packing is made in a single allotropic variety of alumina, so that all the sites behave in the same manner with respect to the constituents of the mixture to be separated.

In particular, if the packing is composed of a powder deposited in an agglomerated suspension by a gel, it is desirable that the powder and gels should be activated to identical species after calcining.

Alternatively, in this same situation, it is possible to choose and to synthesize the reinforcing gel so that its specific surface area after activation is small and negligible compared with that of the powder alumina.

The gel for binding the particles with each other may consist of a reactive mixture of silica and alumina like an aluminosilicate. In particular, clays such as kaolinite, which are aluminosilicates, may appear as a highly fluid and liquid state or a highly viscous precipitated state, which may be used as a binding agent according to the ionic strength of the medium and to the metal cations which it contains. The highly liquid state is used for initially shaping the deposit of a powdery substance on the fibre, and its contact with salts or a saline solution ensures its gelling, or thickening. It may also be used as a binder by drying.

The spacer may consist of a powder adhering to the fibre. This alternative will be particularly simply achieved by coating the fibre with a very small thickness of a viscous and tacky polymer which is UV-crosslinkable like polyacrylic acid diluted with acrylic or methacrylic acid, for example from an aqueous solution, is evaporated on the fibre, water being the light vaporisable solvent, and containing a radical polymerisation photo-initiator. The thereby coated fibre is put into contact with the powder by immersion in a fluid bed of powdery substance or by projection of the latter, which causes agglutination of a solid monolayer of grains on the surface of the fibre. The loaded fibre is exposed to UVs so as to ensure a firm bond between the powder grains having become adherent to the fibre and the core of the wire by photo-polymerisation of the adhesive.

This alternative may quite as simply be achieved by coating the fibre with a viscous solution of a polymer in a solvent, by the agglutination of a solid thickness of grains on the surface of the thereby treated fibre, and by drying the solvent.

The powder may consist of a silica or alumina gel having the desired chromatographic properties for the final product, and moreover synthesized by perfectly known and proven techniques with the desired grain size.

Without departing from the scope of the invention, the powdery solid deposited on the fibre and supported by the monolith, i.e. occluded in or deposited on the monolith, may be a third-party solid body having a varied functional role relatively to the use of the packing. This may in particular be a catalyst, a molecular sieve or an ion exchanger, a kieselguhr or diatomaceous earth. In particular this may be a zeolite.

Zeolites may generally be represented by the generic formula:

$$M_{2/n}O\ Al_2O_3 y\ SiO_2\ w\ H_2O$$

M being a metal cation allowing the charges to be balanced, such as sodium, potassium, magnesium, calcium ion, etc. . . . n representing the valence of the cation and y being equal to two or more.

Following another process, to avoid contact of the channel precursor fibres, these are assembled into a sheet by weaving.

If the precursor fibre is the warp, the weft fibre is used as spacer, and conversely.

The fibre perpendicular to the precursor may be a glass fibre, which has good thermal compatibility in terms of expansion coefficient with the porous mineral material of the monolith.

The chemical inertia of a glass fibre is excellent and comparable with that of silica.

Since its specific surface is small it does not perturb analysis.

The fibres are assembled into a bundle and may be glued to each other.

According to an improvement of the invention, the channel precursor fibres comprise a sub-layer (sub-layer vis-à-vis the monolith, outer layer vis-à-vis the core of the fibre) of another auxiliary solid compound of the method and intended to be evacuated during the latter method. This compound may be a solid substance or polymer soluble in water or in another solvent, a hydrolysable polymer, a water-swelling polymer, or a wax or a metal melting at a temperature higher or slightly higher than the temperature of the manufacturing process of the composite or of any other suitable material.

This sub-layer surrounds the core of the fibre.

This sub-layer is called an ablative layer in this document.

This ablative layer is made by deposit on the core of the fibre before forming the monolith preform.

This so-called ablative layer may be intermediate between the core of the fibre and the spacer.

An ablative layer of wax or metal melts into a liquid product of low viscosity.

This pre-treatment has two advantages:
the expansion differential between the fibre and the matrix can be offset for example by evacuating a liquid molten wax. Therefore it is for example possible to carbonise at a high temperature polymer fibres without destroying a mineral packing containing them. It is also possible to dissolve in a solvent an organic fibre by compensating for the inevitable and potentially destructive phenomena of swelling of the fibre by the solvent through the space left free by the evacuation of the ablative layer.
The disappearance, degradation or evacuation of the ablative layer provides access to the core of a packing, optionally a bulk packing, made from low cost fibres, polyolefins, cellulose acetate, etc. . . . It is therefore possible to provide access thereto for a reagent liquid (acid hydrolysis solution, reinforcing nanosol etc. . . . ), or a drying gas.

Among the existing waxes it is possible, without this list being exhaustive, to use: paraffins, fatty acids higher than C12, the esters of fatty acids such as the esters of glycerin, carnauba wax, aliphatic or aromatic waxes derived from the hydrocarbon industry.

The ablative layer may for example represent between 1% and 40% of the cross-section of the fibre coated with this sub-layer. The core of the fibre, in this case, may advantageously ensure the mechanical strength of the filament.

Advantageously according to the invention, the preforms of the channels, or fibres optionally treated as mentioned above, are subject to the reaction of a binder in order to secure them in a monolith.

It will however be noted that it is possible to carry out a step from the start for removing the fibres from a purely mechanical stack of the latter before the action of a binder. Reactive or dissolving fluids or products of a reaction may actually easily circulate in the depth of the packing through the interstices or lumens left free between the fibres.

This binder may be based on any mineral compound causing cohesion of the monolith such as in particular an aluminium oxide, a silicon oxide, a zirconium oxide, a titanium oxide, a rare earth (like yttrium, cerium or lanthanum) oxide, a boron oxide, an iron oxide, a magnesium, calcium, strontium, or barium oxide, a germanium oxide, a phosphorus oxide, an oxide of lithium, potassium or sodium, a niobium or copper oxide. These compounds may be used pure or as a combination or as a mixture.

According to a preferred embodiment of the invention, the binding action is applied with a sol gel method.

This binder may in particular be a silica or alumina gel, prepared in situ with a sol gel method. A bundle of pre-forms is immersed in a precursor sol of a silica or alumina gel conditioned or treated so that it develops into a gel.

Without departing from the scope of the invention, this sol gel method may also be based on an aluminosilicate like a clay for example.

Without departing from the scope of the invention, this sol gel method may also be based as listed earlier on a zirconium oxide, a titanium oxide, a rare earth (like yttrium, cerium or lanthanum) oxide, a boron oxide, an iron oxide, an oxide of magnesium, calcium, strontium, or barium, a germanium oxide, a phosphorus oxide, an oxide of lithium, potassium or sodium, a niobium or copper oxide. These compounds may be based on the gel or combined together so as to generate a multicomponent gel.

Advantageously as a base of the gel, it is possible to use of gels of zirconium oxide or of titanium oxide.

Among the gels consisting of silicate, it is possible to use binary silicates based on silica and boron oxide, aluminium oxide, germanium oxide, titanium oxide, zirconium oxide, strontium oxide or iron oxide.

Among the gels consisting of silicates, ternary silicates may be used.

Among the gels consisting of silicate, multicomponent silicates including more than three constituents may be used.

Among the gels based on non-siliceous materials, binary oxides of zirconium and yttrium, of zirconium and cerium, of zirconium and calcium, of barium and titanium, of lithium and niobium, of phosphorus and sodium, of boron and lithium, may be used.

Advantageously, the sol gel method leading to these multicomponent gels will be based on the hydrolysis of organometallic compounds such as alkoxides of the relevant metals, alone or as a mixture with other organometallic compounds and optionally with metal salts such as nitrates or chlorides.

This list is not limiting and it is obvious that any other component or mixture of components which may be shaped via the sol gel route enters the scope of the invention.

The method described earlier consisting of depositing a spacer by means of a suspension of silica or alumina or of one of their combinations subsequently gelled in situ (page 19 line 10 to page 20 line 32) may also be applied for producing, strictly speaking, the binder of the fibres between them. In this case, the fibres optionally covered with a spacer are assembled into a bundle and the residual free spaces in this bundle are filled with a suspension containing at least two constituents, a mesoporous or microporous powdery solid mineral, activated silica or alumina gel or other, on the one hand, a mineral binder, silica or alumina sol or an aluminosilicate for example on the other hand. However in this case, it will be an advantage to use relatively viscous suspensions with a high solid concentration in order to limit shrinkage phenomena upon drying. Advantageously, in the latter case, the spacer may be non-porous.

According to a particularly advantageous embodiment, it is possible to form the monolith binding or coating the capillary channels using a process causing the formation of two families of pores, a family of mesopores and a family of interconnected macropores such as described in the publications by N, Ishizuka and Holloway R cited at the beginning of this description. This improvement provides major advantages:

The moist silica gel created by these processes around the channel precursor fibres is highly permeable to fluids and in the moist state allows the circulation through the packing mass of a liquid or gas preferably through its inlet and outlet sides.

This circulating fluid inter alia can have the role of
- modifying the porous structure of the bimodal gel and hence of the final packing.

It may have the role of bringing a reagent into contact with the fibre causing its elimination.

This elimination may be achieved using the previously described methods, in particular by hydrolysis, dissolution or gasification.

It may allow exchanging of mother liquors of the gel by an organic fluid whose drying is less destructive for the gel structure.

It may allow drying of the packing by circulating a gas or supercritical fluid before eliminating the channel precursor fibres.

The high porosity of the walls of the monolith obtained is favourable for rapid completion of diffusion processes between the channels.

The macropores may preferably represent a sufficient fraction of porous volume of the solid mass of the monolith, occupied by the bimodal gel, sufficient to ensure the percolation and interconnection thereof so as to allow the flow of a fluid. Preferably, this fraction is higher than 40% and further preferably higher than 70% in the bimodal gel.

It will be noted that the use of a bimodal gel may be made in combination with the use of an ordinary silica gel. In particular, an ordinary silica gel for powdery chromatography is deposited on a precursor fibre so as to cover it in a close, complete and dense way and so as to be used as a spacer, and these fibres are organized in a bundle. The free space between the fibres and in the pores of the gel is immersed in a precursor solution of a bimodal gel. The resulting bimodal gel is used as a binder to the final monolith, it confines and binds the powdery cover of the fibres and allows easy removal of the core of the fibres freeing the channels.

The chromatographic role towards separation may in such a packing be mainly dedicated to the ordinary gel contained in the final packing.

It will be noted that at all events when the mass of the packing is formed of nanoscopic particles of agglomerated amorphous silica (silica gel) or of any other solid monolithic mass, and particularly a mineral solid mass it can be reinforced before drying either by ripening at a suitable basic pH for silica, or by depositing or precipitating amorphous silica thereupon in an aqueous phase so as achieve mechanical reinforcement by rigidifying its structure.

It is difficult to carry out precipitation of silica in a dense object, since the solubility of silica in water is very low (100 ppm at room temperature, 400 ppm at 100° C.). Permissible supersaturations (of the order of 500 ppm at room temperature), can only reinforce the outer layers of a bulk object since the weak diffusive flow is instantly precipitated in contact with the high specific surface area of the packing. By bulk is meant herein the porous mass of the monolith.

One answer to this problem could be formulated as follows:

This deposit or precipitation can be performed by placing the gel in close contact with nuclei or seeds of amorphous silica of very small diameter, from 2 to 4 nm for example, or nanosol, in concentrated solution under conditions of low ionic strength (molar content of salt less than 0.1 to 0.15 N). The nuclei redissolve and silica re-precipitates around the particles of the gel which have a larger diameter. This is the Ostwald ripening phenomenon.

Actually, these nuclei, on account of their very small diameter and the effect of surface tension forces, are in equilibrium with a concentration of silica in aqueous phase that is greater than that in equilibrium with the constituent silica particles of the packing of specific surface area larger than 350 m²/g for example.

The solubility S of the particles of diameter d (Ralph K. Iler, The chemistry of Silica, 1979, p 50) is written:

$$S/So = \exp(4EV/R/T/d)$$

The surface tension E for silica is of the order of 46 erg/cm² (Iler p54).

These nuclei may be created by acidification up to pH 9 of a dilute solution of sodium silicate, either by an acid, or by an ion exchanger. These nanosols are sufficiently stable to exist for several tens of minutes in solution, at notable concentrations for example 5 to 20 g/l in silica equivalent.

Their contact and their circulation at 90-100° C. in very close proximity with the walls of the capillaries allows the particles of the nanosol to diffuse via Brownian motion inside the constituent gel of the monolith down to major depths, of several hundred microns, and to re-dissolve thereat and deposit reinforcing silica at depth on the surface of this constituent gel of the monolith.

The depth of penetration, i.e. of reinforcement of the gel depends upon the diffusivity of the nanosol (between 0.5 and $1.0 \cdot 10^{-9}$ m²/s, Einstein equation) and on the speed of kinetic phenomena of redissolution-reprecipitation of the amorphous silica between the nanosol and the gel.

It is necessary to operate with nanosols and packing materials impregnated with an aqueous solution of low ionic strength and low basic pH (9 to 10), so as to avoid coalescence of the silica particles between each other.

The driving force of the process is the much greater difference in the silica concentration in an aqueous phase, driving diffusion allowed by the nanosol. This is the concentration difference between the interior of the sol and the interior of the gel making up the monolith.

This method using nanosols for covering a substrate with a film of amorphous silica may in particular be used for making silica monolithic packings based on a structure of another ceramic. In this case, the latter is preformed as a multi-capillary packing before receiving this surface deposit.

A silica packing can be hydrophobized or surface modified by a silane such as hexamethyl disilazane, silanes allowing coupling to $C_1$, $C_2$, $C_4$, $C_8$ or $C_{18}$ straight carbon chains, or any other known silane, such as for example in a nonlimiting way silanes functionalized with cyano, diol, amino groups etc. or any other method for treating a silica surface known in the state of the art.

A packing in alumina can be co-precipitated or impregnated with additives, its acid-base status can be adjusted.

Without departing from the scope of the invention, the channel precursor fibre may be formed of a capillary tube, a fibre of various geometric cross-sections (square, hexagonal, etc).

Without departing from the scope of the invention the channel precursor fibre may itself be porous.

The removal of the core of the fibres should be accomplished so as not to destroy their matrix and/or their envelope layer. The selection may be made from among several techniques, in particular including:

The heating of the whole up to the melting temperature of the core material of the fibres, and removing the liquid under a pressure gradient. Easily meltable metals like tin, lead, bismuth, antimony, alloys thereof (so-called Newton, Darcet alloys, etc.), or thermoplastic resins like polyethylene, polypropylene, PVC, etc. allow this operation to be performed at a low temperature, from 70 to 200° C. for example. In this case, the envelope or matrix and the material of the fibres should be as compatible as possible in terms of thermal expansions, between the manufacturing temperature and the melting temperature. This method allows recycling of the material of the core.

The making up of the fibres with a hydrolysable polymer, assembling the fibres in a bundle, and immersing the bundle in a precursor solution of a mineral oxide, a solution which is gelled around the fibres, and removing the fibres by hydrolysis into soluble low molecular weight species. This manufacturing method is also characterised in that the gel may be reinforced by depositing with amorphous or crystalline growth the mineral oxide at the surface of the particles making it up in order to increase its mechanical strength before its drying.

If the spacer and the matrix are porous and allow impregnation or circulation of a reagent through the assembled bundle, and its contacting with the core material, its removal may be achieved by dissolution, chemical reaction in the liquid or vapour phase, etc. . . . This operation may be conducted at a moderate temperature, thereby avoiding thermal expansion problems. For example the formation of soluble or gaseous metal chlorides by direct action of chlorine on iron wires, or the thermal degradation of polymers into their monomers like in the case of acrylic resins (PMMA), etc. . . . may be used. Dissolution may be achieved with a liquid aqueous or organic solvent or mixture thereof, or with a supercritical fluid.

According to an alternative of this method, the wires (fibres) are assembled parallel with each other in a plane or sheet, and agglomerated with a porous or fibrous binder, or woven so as to conform to a thin sheet. A flexible sheet is obtained by arranging the fibres of the binder perpendicularly to the precursors of the conduits. Chemical etching of the core of the fibres, precursors of the conduits, may be achieved through the upper and lower faces of the sheet. This sheet may then be chemically treated, etc. depending on its use, and stacked or wound according to any arrangement.

The etching of the precursor fibre may be carried out from the extreme faces of the packing, by having the reaction progress through the interior of the conduits.

Very many methods may be used, particularly when the reagent is a gas and the reaction product is a porous solid not adhering to its substrate. For example, in the case of iron wires:

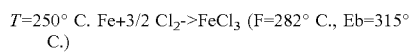
$T=250°$ C. $Fe+3/2\ Cl_2 \rightarrow FeCl_3$ ($F=282°$ C., $Eb=315°$ C.)

The difference between the chlorine gas pressure in equilibrium with the metal and that of the operating conditions applied at the inlet of the fibres allows the chlorine to permanently reach the interface of the fibres and to be consumed. Removal of $FeCl_3$ may be carried out by cyclic evaporation or by gravity with vibrations. Removal of the core of the fibres may take place in several steps for etching and removing the product formed.

From among the hydrolysable polymers, mention may be made inter alia of polyesters of glycolic acid, lactic acid, cellulose, and in particular polyglycolic acid or its copolymers with lactic acid, with c-caprolactone or with trimethylene carbonate. A polymer will preferably be selected, for which hydrolysis is rapid at a temperature from 80 to 100° C.

Generally for producing amorphous silica or activated alumina packings, advantage will fully be taken from the methods described above when the resulting oxide will be pure. Indeed, chemical engineering and in particular chromatography applications are very sensitive to homogeneity of the adsorbing surface and have functional defects very easily if this surface has impurities like metal ions other than those making up the oxide. A significant advantage of a method as the one described above, and in particularly of a sol gel method, is that it gives the possibility of applying very pure oxides at a low temperature, therefore with observance of their porosity and their allotropic variety. Conventional sintering methods on these pure oxides without any flux involve very high temperatures for example above 1,000° C. or 1,500° C. which extensively and undesirably alter the nature of the substrate and causes collapse of the porosity.

Advantageously, the amorphous silica or activated alumina packings for a chromatographic application will have a purity of more than 95% and still more preferentially of more than 99%.

However for certain applications, the monolith may have a role of supporting a functional solid, supported by the mechanical or binding action of the monolith. This solid may be occluded in the porous structure of the packing by adding the latter during any one of the synthesis operations. This for example may be a catalyst, a molecular sieve or an ion exchanger. In particular this may be a zeolite.

Advantageously in this case, the binding material of the monolith may be a clay.

From among zeolites without claiming to be exhaustive, mention will be made of the following products: A,KA; A,NaA; A, CaA; X, NaX; SrBaX; AgX; Y, NaY; KY; Y, $NH_4Y$; Y,HY; Y, USY; Y; dealuminate; L; mordenite; chabazite; ferierite; silicalite /ZSM5; beta; zeolith F; zeolith W.

From among catalysts, mention may also be made of: finely divided metals (e.g. Cu, Ni, Fe, Ru, Co, Re, Pd, Pt, Ag, . . . ) on various supports such as gamma alumina or zeolites or other more inert supports, or metal oxides (e.g. $Cr_2O_3$, $V_2O_5$ . . . ); acid oxides such as zeolites; metal oxides supporting W, Re, Cr, Ti, or Zr complexes; bismuth molybdates, uranium antimonate, other mixed oxides; mixed oxides of Fe and Mo; $Fe_3O_4$ or metal sulphides; Co-Mo/gamma-$Al_2O_2$(sulphurised); Ni—Mo/gamma $Al_2O_3$(sulphurised); Ni-W/gamma $Al_2O_3$(sulphurised).

The packing may advantageously be the support of new materials such as phosphate molecular sieves (containing phosphates) $AlPO_4$, SAPO, mesoporous silicates/aluminosilicates, (MCM-41, . . . ) etc. . . . carbon nanotubes, PILCS etc. . . .

Another process for manufacturing the monolithic material comprises the forming and assembling of thin films. This process uses as base material thin films or sheets of material. This material may be a precursor of amorphous silica, such as a silicon resin.

The process can be implemented by printing channels via etching, photo-etching, drawing or moulding in a sheet of silicone elastomer, and stacking or rolling of the sheets into the shape of the desired final packing. Subsequent treatment by pyrolysis and oxidation transforms the silicon to amorphous silica crossed by free channels.

There again, the silicone resin may contain a solid filler intended to subsist in the final packing and to give it a functionality.

With the latter method, a multicapillary packing is prepared by the assembly of a large number of multicapillary packing elements.

Alternatively, the invention proposes a method for manufacturing a monolithic porous material based on amorphous silica, activated alumina or one of their combinations, characterised in that it comprises the steps of:
 providing a bundle of so-called precursor fibres of the conduits for which the diameter is equal to that of the capillary conduits,
 forming a cross-linked silicone matrix around the fibres,
 removing the fibres so as to form in said matrix said capillary conduits,
 pyrolysis of the silicone so as to leave an amorphous silica residue keeping the imprint of the fibres.

Advantageously, the silicone contains a porous amorphous silica, activated alumina filler or one of their combinations.

Operating procedures and bibliographic sources of silicone pyrolysis methods will be found in the following publications: «Physical Characteristics of a Porous Silica Material Formed by Pyrolysis of Silicone Rubber», Kew-Ho Lee, Soon-Jai Khang, Ceram. Eng. Sci. Proc., 8 (1-2), pp 85-92, (1987); «Silicone Resin Applications for Ceramic Precursor and Composites», M. Narisawa, Materials, 2010, 3, 3518-3536.

FIG. 1 is a cross-sectional view of cylindrical multicapillary packing for chromatography according to the invention, following a direction perpendicular to its major axis.

It comprises a porous mass of amorphous silica 2 and void capillary channels 1 in which the fluid passing through the packing 3 is able to circulate freely.

In the described case, the capillary channels are straight, parallel and regularly spaced. The different channels have morphologies and diameters that are as identical as possible. Each channel passes through the monolithic material i.e. its ends are open on each side 4 and 5 of the cylindrical packing, allowing the circulation of the fluid from the inlet side towards the outlet side.

Said material can therefore be used in a chromatographic column.

Figure 2:
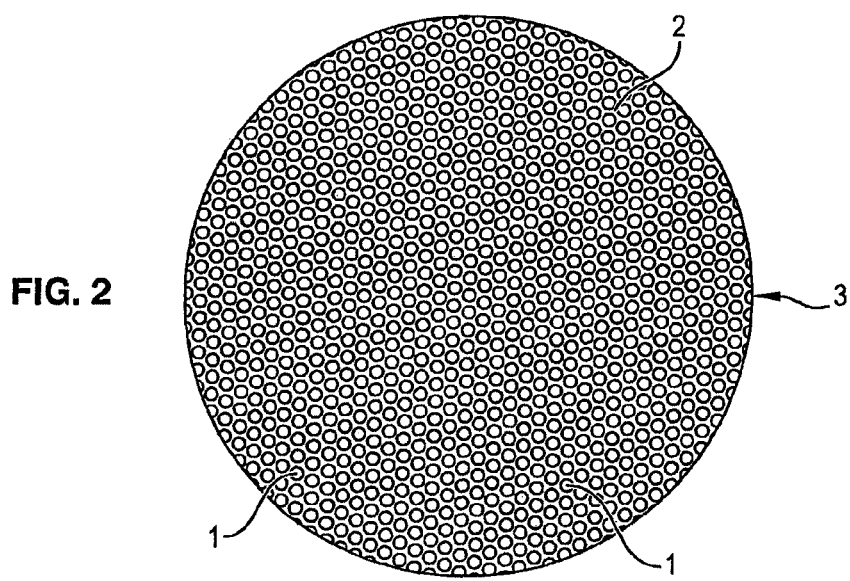
FIG. 2 is an overhead view of one side of the cylindrical packing in FIG. 1.

FIG. 2 is an overhead view of one side 5 of the cylindrical packing seen along direction 6. The openings of individual capillary channels 1 can be seen in the porous mass 2.

Figure 3:
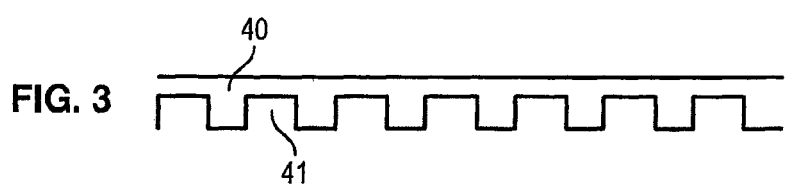
FIG. 3 is a cross-sectional view of a film of silicone elastomer wherein channels are etched which, after stacking or rolling, are intended to form the capillary channels.

FIG. 3 is a cross-sectional view of a film of a silicone elastomer 40 in which transverse channels 41 are arranged that are parallel and perpendicular to the plane of the figure, whose stacking or rolling into cylinder shape about an axis parallel to the channels forms a preform of the final packing.

The preform is then heated and oxidized to obtain the multicapillary packing of amorphous silica with high specific surface area.

Figure 4:
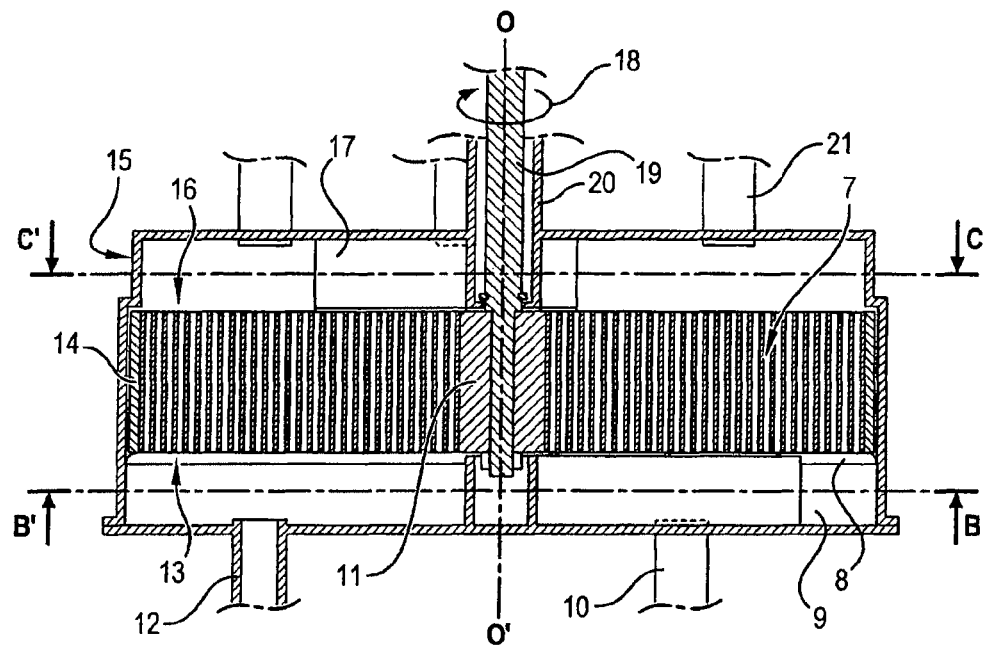
FIGS. 4, 5 and 6 are block diagrams of a continuous annular chromatograph using multicapillary packing according to the invention.
Figure 5:
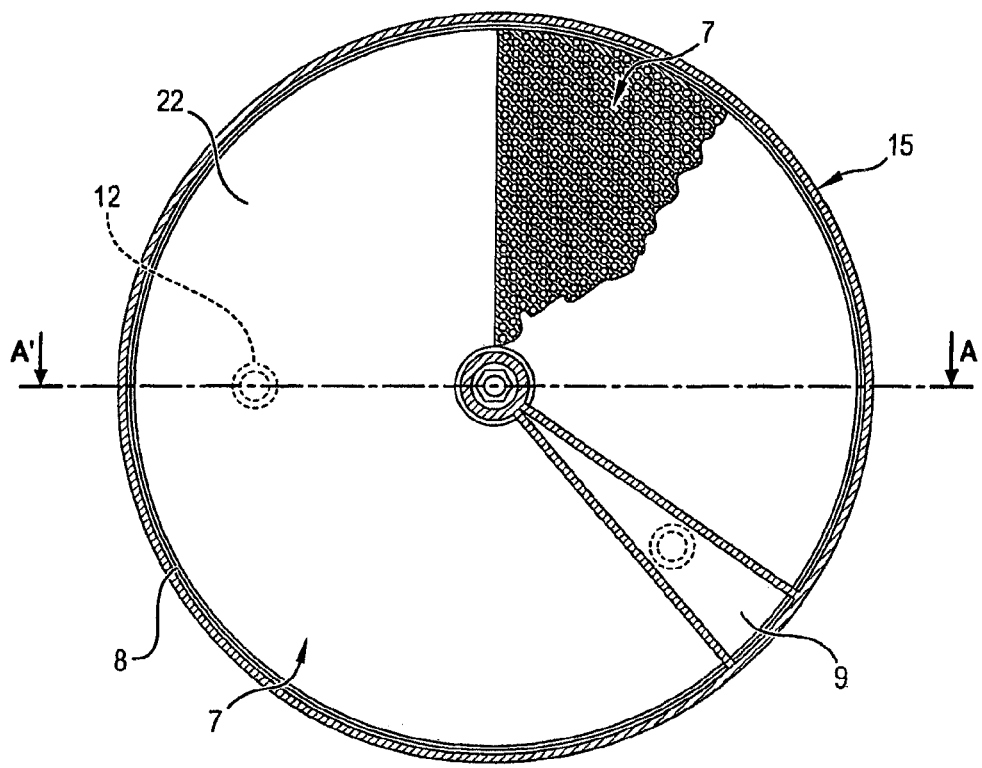
Figure 6:
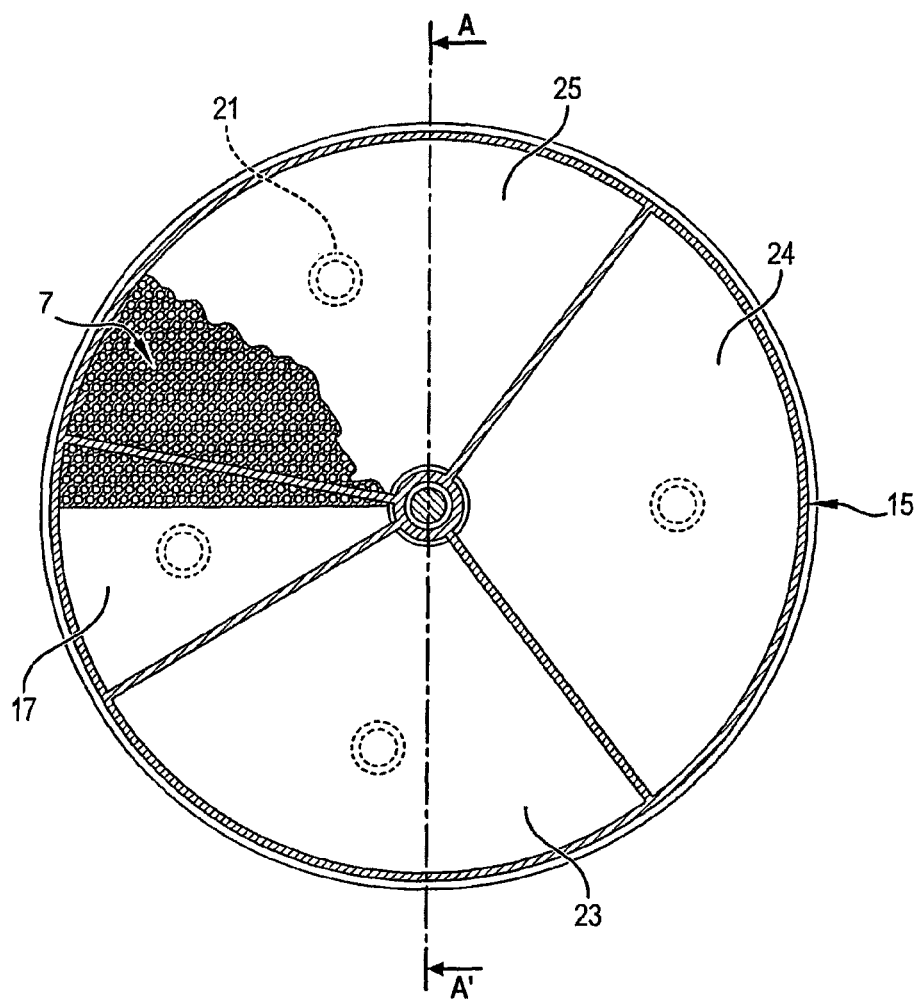

FIGS. 4, 5 and 6 are block diagrams of a continuous annular chromatograph using a multicapillary packing for the separation of two products. Diagram 4 is a cross-section of the instrument along AA'. Diagram 5 is a cross-section of the instrument along BB' (i.e. the upstream part of the chromatograph), diagram 6 is a cross-section of the instrument along CC' (i.e. its downstream part).

Said annular chromatograph comprises a cylinder of multicapillary packing 7 whose capillary channels are parallel to its major axis. Its two sides 13 and 16 act as support for the fluid inlet and outlet assemblies. A representative part of the packing 7 can be seen in cross-section in FIG. 5.

This instrument further comprises fluid inlet 9, 22, and outlet assemblies 17, 25, 24 and 23 which are in the form of angular sectors separated by vertical walls which slide over the packing by means of flexible seals without damaging the packing, or are positioned very close thereto i.e. a few microns or tens of microns away without any direct contact and therefore without any wear part, imparting the seal or the plate separating two sectors with sufficient thickness so that the leak flow rate caused by play is smaller than the flow evacuated towards the downstream side by the fraction of packing lying under the seal.

Owing to the low pressure drop of the multicapillary packing, the relative pressure differences between the different feed sectors of the chromatograph may be relatively high and hence easily adjusted It is effectively easier to adjust a pressure difference of 0.03 bar between two chambers brought to 0.3 bars relative (relative to the atmosphere) than the same pressure difference between two chambers brought to 3 bars (relative). The leak flow rate of the feed and eluting fluids between the different sectors is directly proportional to the square root of the difference in pressure between these sectors, and not to the absolute pressure prevailing therein.

For precise adjustment of this distance, the packing is sealed to an external cylinder which may be in a machined material for example.

The inlet and outlet assemblies are fixed relative to one another.

Each sector on the inlet and outlet sides is connected to an inlet port 10, 12 and outlet port 21.

It will be noted that stepwise elution gradients will easily be made by increasing the number of sectors for feeding different grades of eluent and of regenerating fluids on the upstream face of the packing.

The cylindrical packing and its inlet and outlet assemblies move relative to one another in a circular movement 18 about the axis OO'. This movement is imposed upon the packing by a drive shaft 19 via a central shaft 11 to which the packing is attached.

The packing rotates inside a ferrule 15, 20 closely adjusted to its outer diameter. The feeding of the mixture to be separated via port 10 and of the eluting fluid via port 12 takes place through different sectors 9 and 22 of its upstream surface, and the collection of the different eluted fractions similarly takes place on different sectors of its downstream surface (sectors 17 and 24 for the two separated components and 23 and 21 for the eluent).

The constancy of residence time for each component in the packing allows the collection thereof at determined angular distances of the feed sector. The continuous flow in the feed sectors in this case produces a continuous production flow in the outlet sectors.

The continuous annular chromatographs just described lend themselves particularly well to gas chromatography, the vector gas able to be cooled and recycled or continuously re-circulated by means of low-cost apparatus such as fans, without requiring compressors to be included in the circuit.

In addition, the continuity of the flows avoids the need for gas valves with sequential opening as required by discontinuous industrial installations.

Finally, the low absolute pressures conveyed allow sealed functioning and easy adjustment of the assembly.

Figure 7:
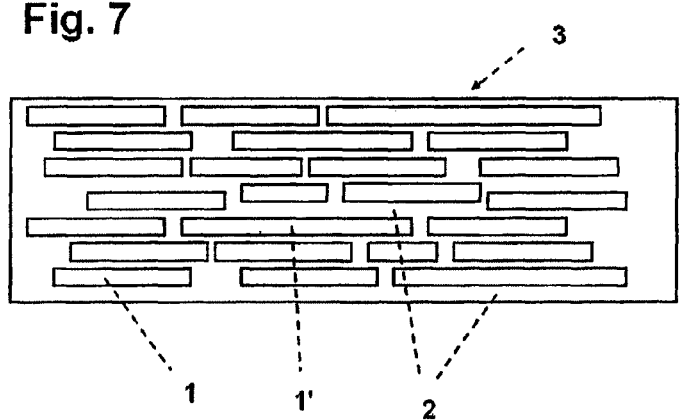
FIG. 7 is a sectional view of a packing for chromatography according to the invention along a direction parallel to its major axis in which the channels are immersed in a porous monolithic mass and are stacked and juxtaposed.

FIG. 7 is a sectional view of a packing for chromatography according to the invention along a direction parallel to its major axis in which the channels 1, 1' are immersed in a porous monolithic mass 2 and are stacked and juxtaposed. In this case, the channels open in an ordered or random way into the material 2 which is permeable to the eluent. In order to view this structure, it may be considered that these channels may have, as precursors, stacked and juxtaposed cut fibres in a directional way so as to give them an average direction parallel to the direction of flow of fluid in the packing. Advantageously according to the invention, the channels have homogeneous lengths and diameters and are as parallel as possible. Advantageously the total and cumulative length along which extend the conduits along the preferential direction of flow of the fluid is greater than or equal to 10 mm. By total and cumulative length is meant the total length covered by the channels in the direction of the eluent flow.

Figure 8:
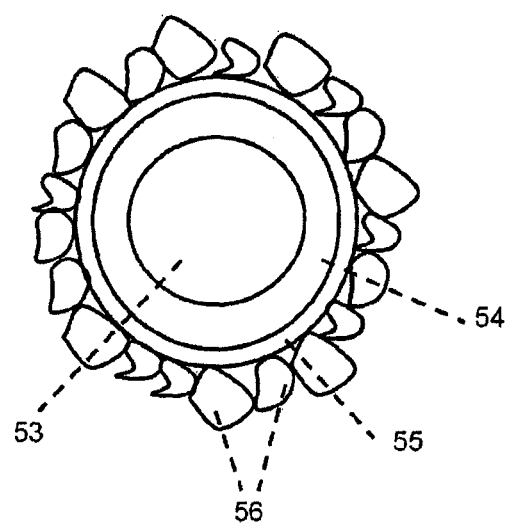
FIG. 8 is a sectional view along a direction perpendicular to its major axis of an example of a precursor fibre of a packing for chromatography according to the invention.

FIG. 8 is a sectional view along a direction perpendicular to its major axis for example of a precursor fibre of a packing for chromatography according to the invention. This fibre may comprise a core 53 in a first material ensuring mechanical solidity of the assembly, an easily removable ablation layer 54, and an adhesive layer 55 and spacer solid grains 56 adhering to the assembly by means of the adhesive layer 55. These grains may be of a regular morphology (spherical for example) or irregular morphology like in this figure. They may be stacked in a compact or dispersed way. They may be porous or non-porous.

Figure 9:
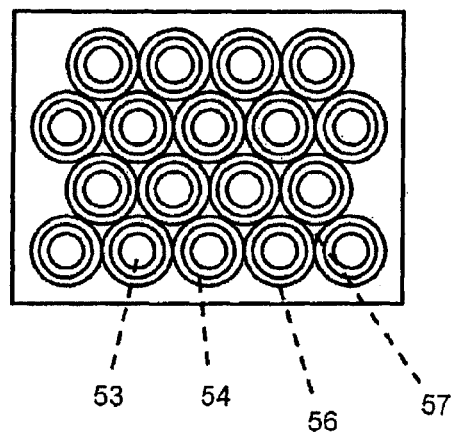
FIG. 9 is a sectional view along a direction perpendicular to its major axis of a stack of precursor fibres of a packing for chromatography according to the invention.

FIG. 9 is a sectional view along a direction perpendicular to its major axis of a stack of fibres, in an optimally ordered and compact way, secured together via a binder filling the interstices or lumens between the fibres 57 like a bimodal gel filling the porosity present between the solid grains 56 and between the fibres 57 and optionally the porous volume of the grains of the solid 56.

Figure 10:
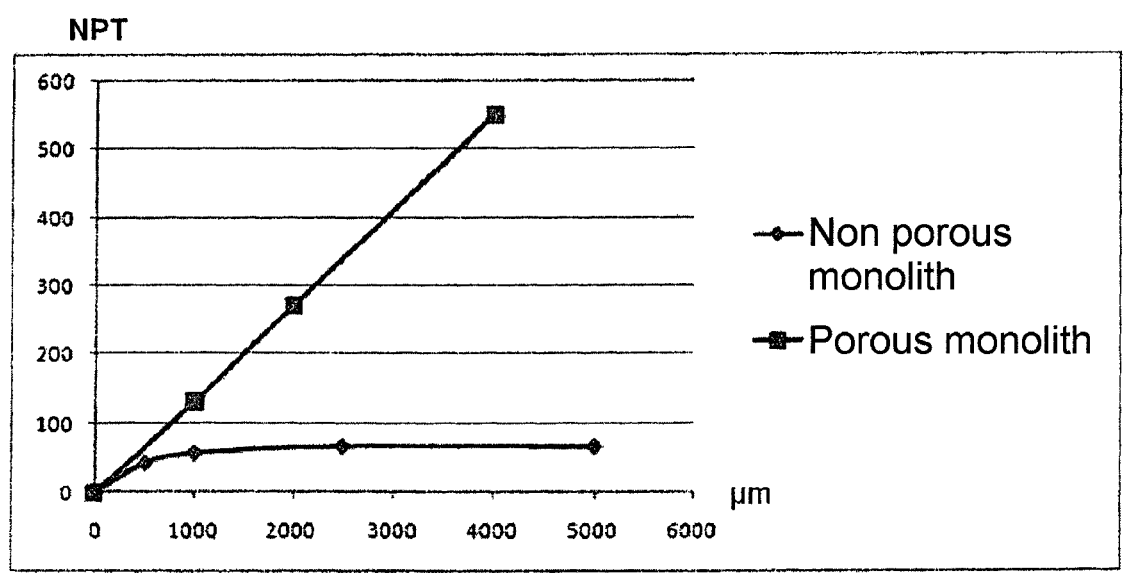
FIG. 10 is a comparative diagram of the efficiency of porous and non-porous multicapillary packings in a chromatographic process.

FIG. 10 compares the efficiencies of a multi-capillary packing with regard to chromatographic separation when the wall separating the capillaries are porous or non-porous.

The axis of the abscissas represents the length of the packing expressed in microns.

The axis of the ordinates represents the efficiency of the packing expressed as a number of theoretical plates.

The diameters of the channels are distributed according to a Gaussian law.

Curve 1 shows the efficiency of a packing for which the walls are non-porous and for which the capillaries behave independently of each other. This efficiency starts to increase and then reaches a ceiling for tending towards a limit independent of the length of the packing. This phenomenon is due to the fact that the diameters of the capillaries are not uniform but distributed according to a random Gaussian law.

Curve 2 shows the efficiency of an identical packing for which the walls are porous and for which the neighbouring capillaries communicate by molecular diffusion. In this case, the efficiency no longer reaches a ceiling but increases in proportion with the length of the packing in spite of the same Gaussian distribution of the diameters. The behavioural non-uniformity of these channels is levelled by molecular diffusion between the latter.

This phenomenon is essentially relevant for a chromatographic process, where high efficiencies are required. This is of secondary importance for an adsorption or catalysis process. This is unimportant for a filtration process.

This is a discovery forming an essential point of the invention.

Its intensity depends on the amount and on the diameters of the pores of the material making up the walls. Low diameter micropores in a large amount slow down the diffusive phenomena between the channels and decrease the efficiency of the packing. Therefore according to the invention, one tries to limit their relative volume to a fraction of the total porous volume of the material making up the walls.

Figure 11:
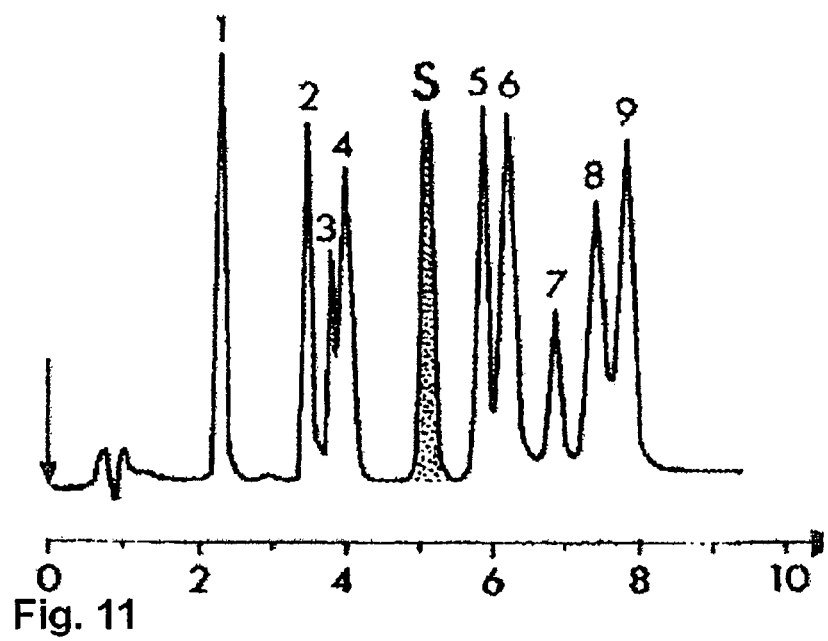
FIG. 11 is a view of a chromatogram illustrating the expected performances of such a method.

FIG. 11 represents a typical chromatogram from a high efficiency chromatographic column with 30,000 theoretical plates. The ten successive peaks are eluted, isolated and separated chemical compounds. It exemplifies the expected performances of a chromatographic column in terms of resolving power.

Figure 12:
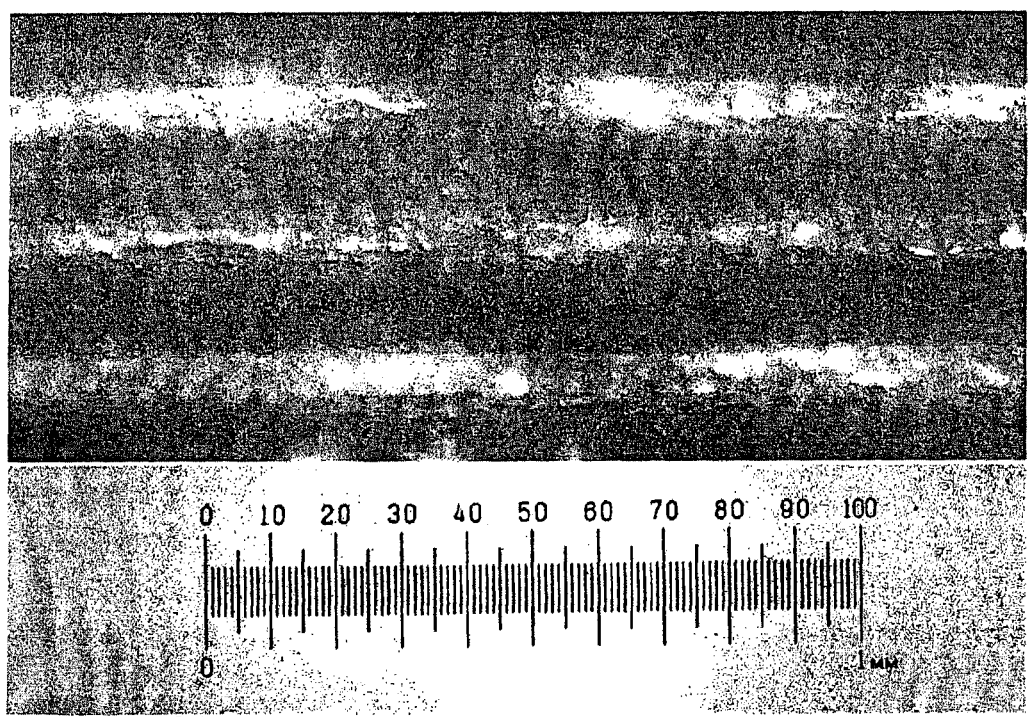
FIG. 12 is a view of a multi-capillary packing according to the invention obtained with a sol gel method.

FIG. 12 shows a packing according to the invention obtained according to Example 1, fractured in order to view the inside thereof. It shows the size regularity of channels and the wall thickness regularity attained by the method according to the invention.

The structures and apparatuses (CAC) described in this paper may be used in all of the fields of chemistry and chemical engineering. Their potential applications in particular cover the field of industry:
separation of n/iso isomers of paraffins;
separation of n/iso isomers of $C_4$ olefins;
separation of para-meta-ortho xylenes;
separation of ethylbenzene from xylenes;
In the field of analytical chemistry:
analytical chromatography in a gas, gas-liquid or gas-solid phase
analytical chromatography in a liquid, liquid-liquid or liquid-solid phase
analytical chromatography in a supercritical phase
In particular in the field of liquid phase chromatography:
partition chromatography on grafted stationary phases and non-ionic polymers
ion exchange chromatography
ion chromatography
ion pair chromatography
ligand exchange chromatography
electron donor-acceptor complex chromatography
steric exclusion chromatography
all the alternatives of affinity chromatography.

EXAMPLES

Example 1

Preparation of a Multicapillary Packing in Silica Using a Sol Gel Process

In this embodiment the fibres are formed of a hydrolysable polymer and are assembled into a bundle. The bundle is immersed in a silica gel precursor solution, a solution which is caused to gel around the fibres; the fibres are then eliminated by hydrolysis to soluble species of low molecular weight.

A Caprosyn Tyco Healthcare monofilament, grade 5 (outer diameter of about 150 µm) is immersed in an aqueous solution containing 10% of a polyvinyl alcohol and 15% by weight of glass micro-beads of diameter between 0 and 40 µm supplied by Potters Ballotini. The monofilament is then dried. In this manner the outside of the Caprosyn filament is coated with glass micro-beads which act as spacers adhering to its surface through the action of the PVA which acts as adhesive.

A bundle is fabricated by assembling 9 of these fibres laterally together in a rectangular section with sides of 2,000 µm by 250 µm and length of 20 mm. The bundle is formed in a rectangular channel of the above-mentioned dimensions, the depth being equal to 250 µm, hollowed out of a hastelloy alloy block of 20 mm×20 mm×10 mm.

The bundle of Caprosyn fibres is impregnated with a mixture of Ludox TM50 (Grace trademark, sol of amorphous silica particles 22 nm in diameter, and specific surface area of 140 m2/g, containing 50% by weight of silica) and 37% hydrochloric acid in adequate proportions to obtain a 3% by weight solution of hydrochloric acid relative to the water. The liquid must fill the entirety of the packing which must be immersed therein. The packing is closed by an upper planar sheet of Teflon, or cover, of identical dimensions to the hastelloy mold. On one plane side of the Teflon cover of the module, a solution of polyglycolic acid or polyglycolide in hexafluoroisopropanol (HFIP) is deposited so as to leave on this side after drying a thickness of polyglycolide of about 5 micrometres. The cover is screwed on the hastelloy block, side coated with the polyglycolide against the packing.

The assembly is brought to 100° C. above a hot water bath.

The sol gels very rapidly under these conditions, in 10 mins to one hour. It produces a non-reinforced packing moulded around the fibres.

Each end of the bundle projecting beyond the Teflon sheets is cut with a very fine blade to release the section of the channels.

The device is left to react for 48 hours at the temperature of 100° C. immersed in a steam bath so as to dissolve the fibres by hydrolysis.

The packing is then opened by removing its cover.

The whole is brought to 105° C. for 24 hours.

The temperature is finally brought to 550° C. for 2 hours in an air atmosphere and then the packing is cooled to room temperature.

Example 2

Preparation of a Multicapillary Packing in a Silica-Zeolite Composite

The starting material is a wire in a tin and lead alloy in proportions of 60%, 40% respectively. Its diameter is 7/10 mm. The wire is cut into rectilinear needles 15 cm in length. A two component liquid silicone elastomer of the RTV type is mixed with its polymerisation activator and with 20% by volume of silica for chromatography with a grain size of 10 µm. The needles are coated with this mixture by soaking. The needles are vulcanized for 24 hours at room temperature. They are then cut into lengths of 100 mm and assembled in a bundle of diameter about 14 mm in a glass tube of length 80 mm and inner diameter of 18 mm.

A two-component liquid silicone elastomer of the RTV type mixed with its polymerization activator are then poured into the tube via the interstices of the needles so as to fill this void space completely. The resin is polymerized for 24 hours at ambient temperature.

The composite thus formed is released by sectioning the needles over a length of 10 mm either side of the glass tube, flush with its ends and perpendicular to the needles. The bundle is brought to 210° C. until melting of the needles and the molten metal is easily eliminated via light circulation of pressurized air.

The packing is released from its glass envelope and gradually pyrolysed under a pure oxygen stream up to 550° C., and then for two hours at this temperature.

Example 3

Making a Multi-Capillary Packing in a Kaolinite-Zeolite Y Composite

The starting material is a wire in a tin and lead alloy in proportions of 60%, 40%, respectively. It has a diameter of 7/10 mm. The wire is cut into rectilinear needles with a length of 15 cm, which are coated by soaking with a layer of a thickness of 10 micrometers of a paraffin melting at 82° C., and then with a fine layer of a mixture of 85% by weight of zeolite NaX, of 15% of kaolinite (based on weight measured after drying) and of surfactant intended for facilitating the wetting of the needle in an amount of demineralised water just sufficient for fluidifying the medium. The needles are placed and dried for 24 hours near a source of heat (50° C.). They are then cut into lengths of 100 mm and assembled in a bundle with a diameter of about 14 mm in a Teflon tube with a length of 18 mm and an inner diameter of 18 mm conditioned into two joined half shells temporarily secured longitudinally.

A Ludox TM50 sol diluted to 20% by weight of acidified solid is then rapidly poured into the tube through the interstices of the needles so as to totally fill this void space. The sol is gelled by bringing the assembly to 80° C. for 48 hrs.

The thereby made composite is released by severing the needles over a length of 10 mm on either side of the glass tube flush with its ends, perpendicularly to the needles. The upper half shell is removed and the module is dried at 75° in a ventilated oven.

The bundle is brought to 210° C. in an oven until the needles melt, and the molten metal is easily removed by a light circulation of pressurized air.

The packing is baked under an air atmosphere by increasing its temperature up to 550° C. at a rate of 1° per min, and then for two hours at this temperature.

Example 4

Making a Multi-Capillary Packing in a Kaolinite-Zeolite X Composite

The starting material is a polypropylene thread with a diameter of 150 µm, is coated by soaking with a layer of a dilution of 85% by weight of zeolite NaX, of 15% of kaolinite (based on weight measured after drying) and of a surfactant intended for facilitating wetting of the fibre, in an amount of demineralised water just sufficient for fluidifying the medium.

The thread is dried by having it pass under a hot air flow at 80° C. rapidly so as to keep high humidity while making it handleable.

The thread is wound in a rectangular stainless steel channel with a width of 5 mm over a depth of 8 mm and with a length of 100 mm.

The thereby obtained bundle is compacted with a press accurately fitted into the channel and along its depth so as to remove the interstices or lumens left free between the fibres.

The thereby made composite is released by severing the threads on either side of the stainless steel channel flush with its ends.

The packing is dried at 105° C. for two hours.

The packing is baked in a nitrogen atmosphere up to 550° C. at a rate of 1° per min, and then for two hours at this temperature.

Example 5

In this variant, polymeric fibres precursors of the channels are assembled in a bundle, the bundle is immersed in a silica gel precursor solution, this solution being caused to gel around the fibres, then the fibres are eliminated by pyrolysis and combustion. The silica gel can be reinforced by depositing silica on the surface of its constituent particles before dying.

A polypropylene monofilament (outer diameter of about 150 μm) is immersed in an aqueous solution containing 10% of a polyvinyl alcohol and 15% by weight of glass micro-beads of diameter between 0 and 40 μm supplied by Potters Ballotini. The monofilament is then dried. In this manner, the outside of the polypropylene filament is coated with glass micro-beads which act as spacers adhering to its surface via the action of the PVA which acts as adhesive.

A bundle is fabricated by assembling these filaments into a bundle of rectangular section, 1700 μm in width, 250 μm in depth and 100 mm in length. This bundle is created by rolling inside such a channel, a channel precisely machined in a sheet of 316L stainless steel 100 mm×20 mm×10 mm. The bundle of polypropylene fibres is impregnated with a mixture of 24.3 g of tetramethylsiloxane, and 57.6 ml of a 1% ammonia solution in water. The liquid must fully wet and fill the packing.

The packing is closed with an upper cover formed of a planar sheet of stainless steel of identical dimensions to those of the base stainless steel sheet, screwed thereupon, on which a thickness of about 5 micrometres of paraffin melting at 62° C. has previously been deposited.

The mixture is left to polymerize and gel for 24 hours at 42° C.

The two ends of the packing are cut flush with the steel sheet to release the section of packing.

The packing has a length of 100 mm.

The packing and its jacket are brought to 90° C. The cover is removed and the packing is dried in dry air at a temperature of 105° C. for 2 hours.

The resulting product is heated up to 650° C. in a nitrogen atmosphere at a rate of 100° C. per hour starting from ambient temperature, for conversion thereof to a multicapillary packing by burning the polymeric fibres.

Once cooled, the packing is again closed on its upper part by a planar sheet of stainless steel, or cover, of same dimensions screwed onto the one containing the packing.

It will be noted that in all the examples provided above, the percentages are weight percentages.

The invention claimed is:

1. A method for producing a packing comprising a monolithic porous material based on a combination including amorphous silica and activated alumina and comprising substantially rectilinear capillary channels parallel to one another, the method comprising the steps of:
    providing a bundle of precursor fibres, wherein a diameter of each precursor fibre is equal to a diameter of each of the capillary channels,
    forming a porous matrix around the precursor fibres based on the combination including amorphous silica and activated alumina by immersing the bundle of precursor fibres within a solution or suspension comprising said combination of amorphous silica and activated alumina,
    eliminating the precursor fibres so as to form in said porous matrix, said capillary channels.

2. The method of claim 1, wherein the elimination of the precursor fibres is achieved through lumens or interstices located between the juxtaposed precursor fibres of the bundle.

3. The method of claim 1, wherein the formation of the porous matrix around the precursor fibers is ensured by a solgel method.

4. The method of claim 1, wherein the monolithic porous material is reinforced by depositing silica at a surface of particles of said material before drying.

* * * * *